United States Patent
Yan et al.

(10) Patent No.: US 10,356,804 B2
(45) Date of Patent: Jul. 16, 2019

(54) DATA TRANSMISSION METHOD AND USER EQUIPMENT

(71) Applicant: Huawei Technologies Co., Ltd., Shenzhen, Guangdong (CN)

(72) Inventors: Zhiyu Yan, Beijing (CN); Xiaoan Fan, Beijing (CN); Sha Ma, Beijing (CN); Qiang Li, Doha (QA)

(73) Assignee: Huawei Technologies Co., Ltd., Shenzhen (CN)

( * ) Notice: Subject to any disclaimer, the term of this patent is extended or adjusted under 35 U.S.C. 154(b) by 190 days.

(21) Appl. No.: 15/153,196

(22) Filed: May 12, 2016

(65) Prior Publication Data

US 2016/0262172 A1     Sep. 8, 2016

Related U.S. Application Data

(63) Continuation of application No. PCT/CN2013/087276, filed on Nov. 15, 2013.

(51) Int. Cl.
*H04W 4/00* (2018.01)
*H04W 72/12* (2009.01)
(Continued)

(52) U.S. Cl.
CPC ......... *H04W 72/1268* (2013.01); *H04L 43/16* (2013.01); *H04W 52/367* (2013.01); *H04W 84/045* (2013.01)

(58) Field of Classification Search
CPC .............................................. H04W 72/1268
See application file for complete search history.

(56) References Cited

U.S. PATENT DOCUMENTS

| 2010/0189047 A1 | 7/2010 | Baum et al. |
| 2012/0115537 A1 | 5/2012 | Gaal et al. |

(Continued)

FOREIGN PATENT DOCUMENTS

| CN | 101057518 A | 10/2007 |
| CN | 101790152 A | 7/2010 |

(Continued)

OTHER PUBLICATIONS

"Small cell challenges and benefits of dual connectivity", Ericsson, ST-Ericsson, 3GPP TSG-RAN WG2 #81, Jan. 28-Feb. 1, 2013, 7 pages, Tdoc R2-130416.

*Primary Examiner* — Gerald A Smarth

(57) ABSTRACT

A data transmission method and user equipment is provides. The method includes: sending, by user equipment (UE), auxiliary scheduling information to a first part of or all of network side devices, an uplink transmission state of the UE is determined according to the auxiliary scheduling information, and perform scheduling on the UE according to the uplink transmission state of the UE, where the uplink transmission state is a first uplink transmission state in which uplink data can be simultaneously transmitted on an uplink carrier corresponding to all of the network side devices, or is a second uplink transmission state in which uplink data can be simultaneously transmitted on an uplink carrier corresponding to a second part of the network side devices; and transmitting, by the UE, data according to scheduling information of the second part of or all of the network side devices.

9 Claims, 5 Drawing Sheets

(51) Int. Cl.
*H04L 12/26* (2006.01)
*H04W 52/36* (2009.01)
*H04W 84/04* (2009.01)

(56) References Cited

U.S. PATENT DOCUMENTS

| | | | |
|---|---|---|---|
| 2013/0003672 A1* | 1/2013 | Dinan | H04L 1/00 370/329 |
| 2013/0010716 A1* | 1/2013 | Dinan | H04W 76/15 370/329 |
| 2013/0153298 A1* | 6/2013 | Pietraski | E21B 7/04 175/45 |
| 2014/0023013 A1 | 1/2014 | Lee et al. | |
| 2014/0056243 A1* | 2/2014 | Pelletier | H04W 74/04 370/329 |
| 2015/0005027 A1 | 1/2015 | Zeng et al. | |
| 2015/0304967 A1 | 10/2015 | Kim et al. | |
| 2016/0081112 A1 | 3/2016 | Dong et al. | |

FOREIGN PATENT DOCUMENTS

| | | |
|---|---|---|
| CN | 102742331 A | 10/2012 |
| CN | 103188792 A | 7/2013 |
| CN | 103281733 A | 9/2013 |
| CN | 103327595 A | 9/2013 |
| EP | 2503830 A2 | 9/2012 |
| WO | 2006/051254 A1 | 5/2006 |
| WO | 2012/024338 A1 | 2/2012 |
| WO | 2012/134244 A2 | 10/2012 |

* cited by examiner

DATA TRANSMISSION METHOD AND USER EQUIPMENT

CROSS-REFERENCE TO RELATED APPLICATIONS

This application is a continuation of International Application No. PCT/CN2013/087276, filed on Nov. 15, 2013, which is hereby incorporated by reference in its entirety.

TECHNICAL FIELD

This application relates to the field of communications technologies, and in particular, to a data transmission method and user equipment.

BACKGROUND

Long Term Evolution-Advanced (Long Term Evolution-Advanced, LTE-A) is a further evolved and enhanced system of a 3rd Generation Partnership Project (3rd Generation Partnership Project, 3GPP) LTE system. In the LTE-A system, to satisfy a requirement of the International Telecommunication Union for a peak data rate of the fourth generation communications technology, a carrier aggregation (CA) technology is introduced, and is also referred to as a spectrum aggregation (Spectrum Aggregation) technology or a bandwidth extension (Bandwidth Extension) technology. In carrier aggregation, spectrums of two or more component carriers (Component Carrier) are aggregated to obtain a wider transmission bandwidth, and the spectrums of the component carriers may be adjacent and continuous spectrums, or may be nonadjacent spectrums within a same frequency band or even discontinuous spectrums within different frequency bands. It is specified in the LTE Rel-8/9 protocol release that user equipment (UE) can access only one of the component carriers to receive and send data. However, LTE-A user equipment may simultaneously access, according to capability and service requirements of the user equipment, multiple component carriers to receive and send data.

To support technologies such as dynamic scheduling, downlink multiple-input multiple-output (MIMO) transmission, and hybrid automatic repeat, UE needs to feed back multiple pieces of uplink control information (Uplink Control Information, UCI), including channel state information (CSI), hybrid automatic repeat acknowledgement information (HARQ-ACK), a scheduling request (SR), and the like, to abase station eNB by using a physical uplink control channel (PUCCH) and a physical uplink shared channel (PUSCH), where the hybrid automatic repeat acknowledgement information may also be referred to as an ACK (Acknowledgment, acknowledgement information)/NACK (Negative Acknowledgement, negative acknowledgement information) for short.

An existing carrier aggregation system aggregates carriers of a same base station or aggregates carriers of a macro cell and a micro cell that have ideal backhaul (Backhaul). For example, the macro cell and the micro cell are connected by using an optical fiber (where in this case, the micro cell may also be a radio frequency head). In this way, joint scheduling may be performed on multiple carriers, that is, when scheduling one carrier of the aggregation carriers, the base station also knows a status of scheduling on another carrier. In this case, when feeding back an HARQ-ACK to a micro base station, UE generally sends the HARQ-ACK to a macro base station by using a PUCCH on an uplink primary component carrier corresponding to the macro base station, and then the macro base station forwards the HARQ-ACK to the micro base station. Because there is ideal backhaul between the macro base station and the micro base station, both the macro base station and the micro base station may obtain, in real time, the HARQ-ACK fed back by the UE.

In a subsequent evolved LTE system, aggregation of carriers between base stations is introduced. In this case, there is non-ideal backhaul between the base stations, that is, data cannot be switched between the base stations in real time, which causes a result that scheduling of multiple carriers belonging to different base stations is independently performed. That is, when scheduling a carrier of the aggregation carriers, a base station does not know a status of scheduling by another base station on another carrier. In a scenario in which macro and micro cells are coupled that is shown in FIG. 1, a macro cell deployed at frequency f1 mainly provides system information, and performs radio link monitoring and mobility management, to ensure service continuity; and multiple micro cells that are deployed at frequency f2 and that are within a coverage area of the macro cell mainly performs transmission of high data-rate services. There is non-ideal backhaul both between the macro cell and the micro cell, and between the micro cells.

In a CA system between the foregoing base stations, because data scheduling of multiple downlink carriers are independently performed by each base station. For example, the macro base station at the frequency f1 and the micro base station at the frequency f2 perform scheduling independently, and for example, UCI of the carriers is separately fed back to the corresponding base stations. That is, multiple carriers of a UE end transmit the UCI, for example, multiple PUCCHs are transmitted simultaneously, or multiple PUSCHs carrying the UCI are transmitted. Moreover, each base station also independently schedules uplink transmit power of UE, and cannot consider a status of scheduling of the UE by the base station. For the UE end, when a sum of transmit powers of all uplink channels and/or signals that are to be transmitted exceeds a maximum transmit power of the UE, power reduction may be executed in some cases. That is, a power of a signal sent to one or more base stations is reduced, so that a total transmit power of the UE satisfies a requirement of not exceeding the maximum transmit power of the UE.

However, reduction of a power of a signal sent to one or more base stations may cause that the corresponding signal occupies a transmission resource but cannot be correctly demodulated by the base station, thereby reducing overall performance of the system. Moreover, when uplink signals that are sent by the UE end to multiple base stations corresponding to multiple carriers have relatively high timeliness requirements in sending, for example, if the UE needs to simultaneously feed back HARQ-ACK signals to two base stations, reduction of a power of a signal sent by one or more base stations may cause that a HARQ-ACK of downlink data sent by the one or more base stations to the UE cannot be correctly received for a long time, thereby causing ineffectiveness of data transmission, and affecting the overall performance of the system.

To resolve the foregoing technical problem, in the CA system between the foregoing base stations, there may be a type of UE with a relatively low capability, and this type of UE cannot perform uplink sending simultaneously on a carrier corresponding to multiple base stations, and can work, at each moment, on only an uplink carrier corresponding to one base station. When this type of UE works in the CA system between the foregoing base stations, the user equipment with such a capability can also work in the CA system between the base stations by limiting scheduling of the UE by the two base stations or by modifying a time sequence in which the UE feeds back HARQ-ARQs of the downlink data to the base stations or by using another method. Moreover, for this type of UE, a phenomenon that a total power of uplink signals that are sent by a UE end to multiple base stations corresponding to multiple carriers exceeds a maximum transmit power of the UE does not occur.

However, during a process of implementing the technical solutions in the embodiments of this application, the applicant finds that during uplink sending, UE that cannot simultaneously work on an uplink carrier corresponding to multiple base stations can work in a CA system between base stations by using the method in the prior art, and a phenomenon that a total power of uplink signals that are sent by a UE end to multiple base stations corresponding to multiple carriers exceeds a maximum transmit power of the UE does not occur. However, if the UE has a capability of simultaneously working on the uplink carrier corresponding to the multiple base stations, use of the same method causes problems that the capability of the UE is not fully used and scheduling of downlink data may be limited.

SUMMARY

This application provides a data transmission method and user equipment, to resolve a technical problem in the prior art that for UE that has a capability of simultaneously working on an uplink carrier corresponding to multiple base stations, the capability of the UE is not fully used.

A first aspect of this application provides a data transmission method, including:

sending, by user equipment UE, auxiliary scheduling information to a first part of or all of network side devices, to instruct the first part of or all of the network side devices to determine an uplink transmission state of the UE according to the auxiliary scheduling information and determine, according to the uplink transmission state of the UE, whether network side devices that can trigger the UE to transmit data are all of the network side devices or are a second part of the network side devices, where the uplink transmission state is a first uplink transmission state in which uplink data can be simultaneously transmitted on an uplink carrier corresponding to all of the network side devices, or is a second uplink transmission state in which uplink data can be simultaneously transmitted on an uplink carrier corresponding to the second part of the network side devices; and transmitting, by the UE, data according to scheduling information sent by the second part of or all of the network side devices.

With reference to the first aspect, in a first possible implementation manner of the first aspect, the auxiliary scheduling information is specifically: indication information for indicating an uplink transmission state suggested by the UE or indicating that the UE needs to switch an uplink transmission state; or power information.

With reference to the first possible implementation manner of the first aspect, in a second possible implementation manner of the first aspect, when the uplink transmission state suggested by the UE is the second uplink transmission state, the auxiliary scheduling information further includes identifier information of the second part of the network side devices.

With reference to the first possible implementation manner of the first aspect or the second possible implementation manner of the first aspect, in a third possible implementation manner of the first aspect, the suggested uplink transmission state or that the UE needs to switch an uplink transmission state is determined by using the following steps: determining, by the UE, a transmit power of an uplink channel to be sent to each network side device, and determining, according to a sum of all determined transmit powers and a maximum transmit power of the UE, the suggested uplink transmission state or that the UE needs to switch an uplink transmission state.

With reference to the third possible implementation manner of the first aspect, in a fourth possible implementation manner of the first aspect, if a current uplink transmission state of the UE is the second transmission state, comparing, with a preset first threshold, a quantity of times that the sum of the transmit powers exceeds the maximum transmit power within a preset time period, and if the quantity of times within the preset time period is less than the preset first threshold, determining that the suggested uplink transmission state is the first uplink transmission state; or determining that the uplink transmission state of the UE needs to be switched from the second transmission state to the first transmission state; or if a current uplink transmission state of the UE is the first transmission state, comparing, with a preset second threshold, a quantity of times that the sum of the transmit powers exceeds the maximum transmit power within a preset time period, and if the quantity of times within the preset time period is greater than the preset second threshold, determining that the suggested uplink transmission state is the second uplink transmission state; or determining that the uplink transmission state of the UE needs to be switched from the first transmission state to the second transmission state.

With reference to the first aspect or any one of the first possible implementation manner of the first aspect to the fourth possible implementation manner of the first aspect, in a fifth possible implementation manner of the first aspect, the sending, by user equipment UE, auxiliary scheduling information to a first part of or all of network side devices includes: when the first part of the network side devices can control scheduling by another network side device, sending, by the UE, the auxiliary scheduling information to the first part of the network side devices.

A second aspect of this application provides a data transmission method, including:

receiving, by a network side device, auxiliary scheduling information sent by user equipment UE; determining, by the network side device, an uplink transmission state of the UE according to the auxiliary scheduling information, where the uplink transmission state is a first uplink transmission state in which uplink data can be simultaneously transmitted on an uplink carrier corresponding to all of network side devices, or is a second uplink transmission state in which uplink data can be simultaneously transmitted on an uplink carrier corresponding to a part of network side devices; and determining, by the network side device according to the determined uplink transmission state, whether network side devices that can trigger the UE to transmit data are all of the network side devices or are the part of the network side devices.

With reference to the second aspect, in a first possible implementation manner of the second aspect, the determining, by the network side device, an uplink transmission state of the UE according to the auxiliary scheduling information sent by the user equipment UE includes:

determining, by the network side device, the uplink transmission state of the UE according to power information sent by the UE; or determining, by the network side device, the uplink transmission state of the UE according to indication information sent by the UE, where the indication information is used to indicate an uplink transmission state suggested by the UE or indicate that the UE needs to switch an uplink transmission state.

With reference to the first possible implementation manner of the second aspect, in a second possible implementation manner of the second aspect, the determining, by the network side device, the uplink transmission state of the UE according to power information sent by the UE includes: determining, by the network side device according to the power information, a transmit power of an uplink channel that is to be sent by the UE to each network side device; and determining, by the network side device, the uplink transmission state of the UE according to a sum of all determined transmit powers and a maximum transmit power of the UE.

With reference to the second possible implementation manner of the second aspect, in a third possible implementation manner of the second aspect, the determining, by the network side device, the uplink transmission state of the UE according to a sum of all determined transmit powers and a maximum transmit power of the UE includes: if a current uplink transmission state of the UE is the second transmission state, comparing, by the network side device with a preset first threshold, a quantity of times that the sum of the transmit powers exceeds the maximum transmit power within a preset time period, and if the quantity of times within the preset time period is less than the preset first threshold, determining that the uplink transmission state of the UE is the first uplink transmission state; or if a current uplink transmission state of the UE is the first transmission state, comparing, by the network side device with a preset second threshold, a quantity of times that the sum of the transmit powers exceeds the maximum transmit power within a preset time period, and if the quantity of times within the preset time period is greater than the preset second threshold, determining that the uplink transmission state of the UE is the second uplink transmission state.

With reference to the first possible implementation manner of the second aspect, in a fourth possible implementation manner of the second aspect, when the uplink transmission state suggested by the UE is the second uplink transmission state, the auxiliary scheduling information further includes identifier information of the part of the network side devices.

With reference to the second aspect or any one of the first possible implementation manner of the second aspect to the fourth possible implementation manner of the second aspect, in a fifth possible implementation manner of the second aspect, after the determining, by the network side device according to the determined uplink transmission state, whether network side devices that can trigger the UE to transmit data are all of the network side devices or are the part of the network side devices, the method further includes: determining, by the network side device, scheduling manners of all of the network side devices or the part of the network side devices for the UE.

With reference to the fifth possible implementation manner of the second aspect, in a sixth possible implementation manner of the second aspect, after the determining, by the network side device, scheduling manners of all of the network side devices or the part of the network side devices for the UE, the method further includes: notifying, by the network side device, the UE of the uplink transmission state determined by the network side device and the scheduling manner for the UE.

With reference to the fifth possible implementation manner of the second aspect or the sixth possible implementation manner of the second aspect, in a seventh possible implementation manner of the second aspect, after the determining, by the network side device, scheduling manners of all of the network side devices or the part of the network side devices for the UE, the method further includes: forwarding, by the network side device, the determined uplink transmission state and the scheduling manner for the UE to another network side device, and notifying the another network side device to trigger, according to the determined uplink transmission state and the scheduling manner for the UE, the UE to transmit data.

With reference to the second aspect or any one of the first possible implementation manner of the second aspect to the seventh possible implementation manner of the second aspect, in an eighth possible implementation manner of the second aspect, after the receiving, by a network side device, auxiliary scheduling information sent by user equipment UE, the method further includes: forwarding, by the network side device, the auxiliary scheduling information to another network side device.

A third aspect of this application provides user equipment, including:

a first sending unit, configured to send auxiliary scheduling information to a first part of or all of network side devices, to instruct the first part of or all of the network side devices to determine an uplink transmission state of the user equipment UE according to the auxiliary scheduling information and determine, according to the uplink transmission state of the UE, whether network side devices that can trigger the UE to transmit data are all of the network side devices or are a second part of the network side devices, where the uplink transmission state is a first uplink transmission state in which uplink data can be simultaneously transmitted on an uplink carrier corresponding to all of the network side devices, or is a second uplink transmission state in which uplink data can be simultaneously transmitted on an uplink carrier corresponding to the second part of the network side devices; and a second sending unit, configured to transmit data according to scheduling information sent by the second part of or all of the network side devices.

With reference to the third aspect, in a first possible implementation manner of the third aspect, the auxiliary scheduling information is specifically: indication information for indicating an uplink transmission state suggested by the UE or indicating that the UE needs to switch an uplink transmission state; or power information.

With reference to the first possible implementation manner of the third aspect, in a second possible implementation manner of the third aspect, when the uplink transmission state suggested by the UE is the second uplink transmission state, the auxiliary scheduling information further includes identifier information of the second part of the network side devices.

With reference to the first possible implementation manner of the third aspect or the second possible implementation manner of the third aspect, in a third possible implementation manner of the third aspect, the user equipment further includes: a determining unit, configured to determine a transmit power of an uplink channel to be sent to each network side device, and determine, according to a sum of all determined transmit powers and a maximum transmit power of the UE, the suggested uplink transmission state or that the UE needs to switch an uplink transmission state.

With reference to the third possible implementation manner of the third aspect, in a fourth possible implementation manner of the third aspect, the determining unit is specifically configured to: if a current uplink transmission state of the UE is the second transmission state, compare, with a preset first threshold, a quantity of times that the sum of the transmit powers exceeds the maximum transmit power within a preset time period, and if the quantity of times within the preset time period is less than the preset first threshold, determine that the suggested uplink transmission state is the first uplink transmission state; or determine that the uplink transmission state of the UE needs to be switched from the first transmission state to the second transmission state; or if a current uplink transmission state of the UE is the first transmission state, compare, with a preset second threshold, a quantity of times that the sum of the transmit powers exceeds the maximum transmit power within a preset time period, and if the quantity of times within the preset time period is greater than the preset second threshold, determine that the suggested uplink transmission state is the second uplink transmission state; or determine that the uplink transmission state of the UE needs to be switched from the first transmission state to the second transmission state.

With reference to the third aspect or the first possible implementation manner of the third aspect to the fourth possible implementation manner of the third aspect, in a fifth possible implementation manner of the third aspect, the first sending unit is specifically configured to: when the first part of the network side devices can control scheduling by another network side device, send the auxiliary scheduling information to the first part of the network side devices.

A fourth aspect of this application provides user equipment, including:

a sender, configured to send auxiliary scheduling information to a first part of or all of network side devices, to instruct the first part of or all of the network side devices to determine an uplink transmission state of the user equipment UE according to the auxiliary scheduling information and determine, according to the uplink transmission state of the UE, whether network side devices that can trigger the UE to transmit data are all of the network side devices or are a second part of the network side devices, where the uplink transmission state is a first uplink transmission state in which uplink data can be simultaneously transmitted on an uplink carrier corresponding to all of the network side devices, or is a second uplink transmission state in which uplink data can be simultaneously transmitted on an uplink carrier corresponding to the second part of the network side devices; and further configured to transmit data according to scheduling information sent by the second part of or all of the network side devices; and a processor, configured to process data before the sender transmits the data.

With reference to the fourth aspect, in a first possible implementation manner of the fourth aspect, the auxiliary scheduling information is specifically: indication information for indicating an uplink transmission state suggested by the UE or indicating that the UE needs to switch an uplink transmission state; or power information.

With reference to the first possible implementation manner of the fourth aspect, in a second possible implementation manner of the fourth aspect, when the uplink transmission state suggested by the UE is the second uplink transmission state, the auxiliary scheduling information further includes identifier information of the second part of the network side devices.

With reference to the first possible implementation manner of the fourth aspect or the second possible implementation manner of the fourth aspect, in a third possible implementation manner of the fourth aspect, the user equipment further includes: the processor, configured to determine a transmit power of an uplink channel to be sent to each network side device, and determine, according to a sum of all determined transmit powers and a maximum transmit power of the UE, the suggested uplink transmission state or that the UE needs to switch an uplink transmission state.

With reference to the third possible implementation manner of the fourth aspect, in a fourth possible implementation manner of the fourth aspect, the processor is specifically configured to: if a current uplink transmission state of the UE is the second transmission state, compare, with a preset first threshold, a quantity of times that the sum of the transmit powers exceeds the maximum transmit power within a preset time period, and if the quantity of times within the preset time period is less than the preset first threshold, determine that the suggested uplink transmission state is the first uplink transmission state; or determine that the uplink transmission state of the UE needs to be switched from the first transmission state to the second transmission state; or if a current uplink transmission state of the UE is the first transmission state, compare, with a preset second threshold, a quantity of times that the sum of the transmit powers exceeds the maximum transmit power within a preset time period, and if the quantity of times within the preset time period is greater than the preset second threshold, determine that the suggested uplink transmission state is the second uplink transmission state; or determine that the uplink transmission state of the UE needs to be switched from the first transmission state to the second transmission state.

With reference to the fourth aspect or the first possible implementation manner of the fourth aspect to the fourth possible implementation manner of the fourth aspect, in a fifth possible implementation manner of the fourth aspect, the sender is specifically configured to: when the first part of the network side devices can control scheduling by another network side device, send the auxiliary scheduling information to the first part of the network side devices.

A fifth aspect of this application provides a network side device, including:

a receiving unit, configured to receive auxiliary scheduling information sent by user equipment UE; a determining unit, configured to determine an uplink transmission state of the UE according to the auxiliary scheduling information, where the uplink transmission state is a first uplink transmission state in which uplink data can be simultaneously transmitted on an uplink carrier corresponding to all of network side devices, or is a second uplink transmission state in which uplink data can be simultaneously transmitted on an uplink carrier corresponding to a part of network side devices; and a processing unit, configured to determine, according to the determined uplink transmission state, whether network side devices that can trigger the UE to transmit data are all of the network side devices or are the part of the network side devices.

With reference to the fifth aspect, in a first possible implementation manner of the fifth aspect, the determining unit is specifically configured to determine the uplink transmission state of the UE according to power information sent by the UE; or determine the uplink transmission state of the UE according to indication information sent by the UE, where the indication information is used to indicate an uplink transmission state suggested by the UE or indicate that the UE needs to switch an uplink transmission state.

With reference to the first possible implementation manner of the fifth aspect, in a second possible implementation manner of the fifth aspect, the determining unit is specifically configured to determine, by the network side device, according to the power information, a transmit power of an uplink channel that is to be sent by the UE to each network side device; and determine the uplink transmission state of the UE according to a sum of all determined transmit powers and a maximum transmit power of the UE.

With reference to the second possible implementation manner of the fifth aspect, in a third possible implementation manner of the fifth aspect, the determining unit is specifically configured to: if a current uplink transmission state of the UE is the second transmission state, compare, with a preset first threshold, a quantity of times that the sum of the transmit powers exceeds the maximum transmit power within a preset time period, and if the quantity of times within the preset time period is less than the preset first threshold, determine that the uplink transmission state of the UE is the first uplink transmission state; or if a current uplink transmission state of the UE is the first transmission state, compare, with a preset second threshold, a quantity of times that the sum of the transmit powers exceeds the maximum transmit power within a preset time period, and if the quantity of times within the preset time period is greater than the preset second threshold, determine that the uplink transmission state of the UE is the second uplink transmission state.

With reference to the first possible implementation manner of the fifth aspect, in a fourth possible implementation manner of the fifth aspect, when the uplink transmission state suggested by the UE is the second uplink transmission state, the auxiliary scheduling information further includes identifier information of the part of the network side devices.

With reference to the fifth aspect or any one of the first possible implementation manner of the fifth aspect to the fourth possible implementation manner of the fifth aspect, in a fifth possible implementation manner of the fifth aspect, the determining unit is further configured to determine scheduling manners of all of the network side devices or the part of the network side devices for the UE.

With reference to the fifth possible implementation manner of the fifth aspect, in a sixth possible implementation manner of the fifth aspect, the network side device further includes: a first sending unit, configured to notify the UE of the uplink transmission state determined by the network side device and the scheduling manner for the UE.

With reference to the fifth possible implementation manner of the fifth aspect or the sixth possible implementation manner of the fifth aspect, in a seventh possible implementation manner of the fifth aspect, the network side device further includes: a second sending unit, configured to forward the determined uplink transmission state and the scheduling manner for the UE to another network side device, and notify the another network side device to trigger, according to the determined uplink transmission state and the scheduling manner for the UE, the UE to transmit data.

With reference to the fifth aspect or any one of the first possible implementation manner of the fifth aspect to the seventh possible implementation manner of the fifth aspect, in an eighth possible implementation manner of the fifth aspect, the network side device further includes: a third sending unit, configured to forward the auxiliary scheduling information to another network side device.

A sixth aspect of this application provides a network side device, including:

a receiver, configured to receive auxiliary scheduling information sent by user equipment UE; and a processor, configured to determine an uplink transmission state of the UE according to the auxiliary scheduling information, where the uplink transmission state is a first uplink transmission state in which uplink data can be simultaneously transmitted on an uplink carrier corresponding to all of network side devices, or is a second uplink transmission state in which uplink data can be simultaneously transmitted on an uplink carrier corresponding to a part of network side devices; and further configured determine, according to the determined uplink transmission state, whether network side devices that can trigger the UE to transmit data are all of the network side devices or are the part of the network side devices.

With reference to the sixth aspect, in a first possible implementation manner of the sixth aspect, the processor is specifically configured to determine the uplink transmission state of the UE according to power information sent by the UE; or determine the uplink transmission state of the UE according to indication information sent by the UE, where the indication information is used to indicate an uplink transmission state suggested by the UE or indicate that the UE needs to switch an uplink transmission state.

With reference to the first possible implementation manner of the sixth aspect, in a second possible implementation manner of the sixth aspect, the processor is specifically configured to determine, according to the power information, a transmit power of an uplink channel that is to be sent by the UE to each network side device; and determine the uplink transmission state of the UE according to a sum of all determined transmit powers and a maximum transmit power of the UE.

With reference to the second possible implementation manner of the sixth aspect, in a third possible implementation manner of the sixth aspect, the processor is specifically configured to: if a current uplink transmission state of the UE is the second transmission state, compare, with a preset first threshold, a quantity of times that the sum of the transmit powers exceeds the maximum transmit power within a preset time period, and if the quantity of times within the preset time period is less than the preset first threshold, determine that the uplink transmission state of the UE is the first uplink transmission state; or if a current uplink transmission state of the UE is the first transmission state, compare, with a preset second threshold, a quantity of times that the sum of the transmit powers exceeds the maximum transmit power within a preset time period, and if the quantity of times within the preset time period is greater than the preset second threshold, determine that the uplink transmission state of the UE is the second uplink transmission state.

With reference to the first possible implementation manner of the sixth aspect, in a fourth possible implementation manner of the sixth aspect, when the uplink transmission state suggested by the UE is the second uplink transmission state, the auxiliary scheduling information further includes identifier information of the part of the network side devices.

With reference to the sixth aspect or the first possible implementation manner of the sixth aspect to the fourth possible implementation manner of the sixth aspect, in a fifth possible implementation manner of the sixth aspect, the processor is further configured to determine scheduling manners of all of the network side devices or the part of the network side devices for the UE.

With reference to the fifth possible implementation manner of the sixth aspect, in a sixth possible implementation manner of the sixth aspect, the network side device further includes: a sender, configured to notify the UE of the uplink transmission state determined by the network side device and the scheduling manner for the UE.

With reference to the sixth possible implementation manner of the sixth aspect, in a seventh possible implementation manner of the sixth aspect, the sender is further configured to forward the determined uplink transmission state and the scheduling manner for the UE to another network side device, and notify the another network side device to trigger, according to the determined uplink transmission state and the scheduling manner for the UE, the UE to transmit data.

With reference to the sixth possible implementation manner of the sixth aspect or the seventh possible implementation manner of the sixth aspect, in an eighth possible implementation manner of the sixth aspect, the sender is further configured to forward the auxiliary scheduling information to another network side device.

One or more technical solutions provided in embodiments of this application have at least the following technical effects or advantages:

In the embodiments of this application, UE may work in two uplink transmission states, where a first uplink transmission state is specifically a state in which the UE can simultaneously transmit uplink data on an uplink carrier corresponding to all of network side devices, and a second uplink transmission state is specifically a state in which the UE can simultaneously transmit uplink data on an uplink carrier corresponding to a second part of the network side devices; a network side device can determine an uplink transmission state of the UE according to auxiliary scheduling information sent by the UE, and further determine, according to the uplink transmission state of the UE, whether network side devices that can trigger the UE to transmit data are all of the network side devices or are the part of the network side devices; and then the UE transmits data according to scheduling information sent by the part of or all of the network side devices. As can be seen, in the embodiments, a usage degree of a capability of UE can be determined according to auxiliary scheduling information, and when an actual situation allows, the capability of the UE can be fully used, and uplink data is transmitted on an uplink carrier corresponding to all of network side devices; or when an actual situation does not allow, the capability of the UE is controlled, and the UE transmits uplink data on an uplink carrier corresponding to a second part of the network side devices. Therefore, compared with a case in the prior art that the UE can work, at each moment, on only an uplink carrier corresponding to one base station, the capability of the UE is fully used, and waste of resources is avoided.

DESCRIPTION OF EMBODIMENTS

Figure 1:
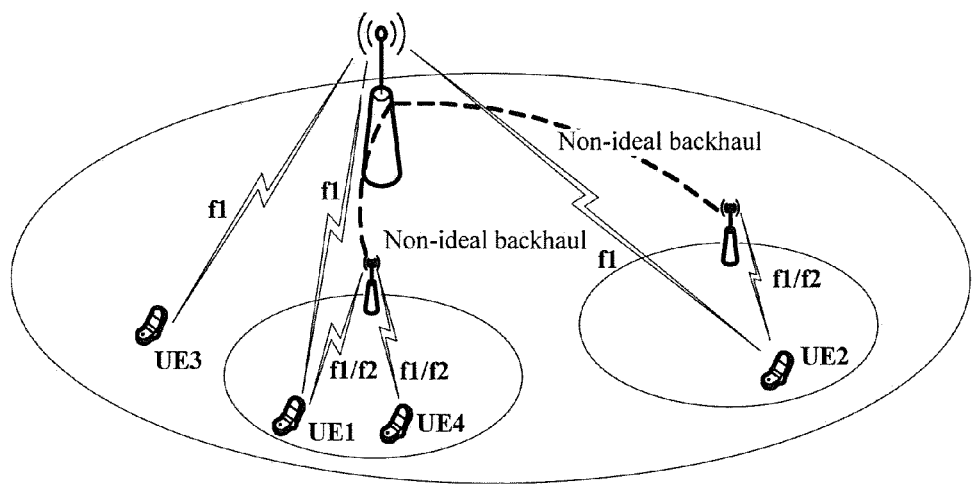
FIG. 1 is a schematic diagram of a scenario in the prior art in which a macro base station is coupled to a micro base station.

The embodiments of this application provides a data transmission method and user equipment, to resolve a technical problem existing in the prior art that for UE that has a capability of simultaneously working on an uplink carrier corresponding to multiple base stations, the capability of the UE is not fully used.

To resolve the foregoing technical problem, the technical solutions in the embodiments of this application have the following general concept:

In the embodiments of this application, UE may work in two uplink transmission states. A first uplink transmission state is specifically a state in which the UE can simultaneously transmit uplink data on an uplink carrier corresponding to all network side devices. A second uplink transmission state is specifically a state in which the UE can simultaneously transmit uplink data on an uplink carrier corresponding to a second part of the network side devices. A network side device can determine an uplink transmission state of the UE according to auxiliary scheduling information sent by the UE, and further determine, according to the uplink transmission state of the UE, whether network side devices that can trigger the UE to transmit data are all of the network side devices or are the second part of the network side devices; and then the UE transmits data according to scheduling information sent by the second part of or all of the network side devices. As can be seen, in the embodiments, a usage degree of a capability of UE can be determined according to auxiliary scheduling information, and when an actual situation allows, the capability of the UE can be fully used, and uplink data is transmitted on an uplink carrier corresponding to all network side devices; or when an actual situation does not allow, the capability of the UE is controlled, and the UE transmits uplink data on an uplink carrier corresponding to a second part of the network side devices. Therefore, compared with a case in the prior art that the UE can work, at each moment, only on an uplink carrier corresponding to one base station, the capability of the UE is fully used, and waste of resources is avoided.

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

This specification describes various aspects with reference to user equipment and/or a base station.

The user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (such as RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be called a system, a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

The base station (for example, an access point) may refer to a device in communication with a wireless terminal via one or more sectors at an air interface in an access network. The base station may be configured to mutually convert a received over-the-air frame and an IP packet and serve as a router between the wireless terminal and a rest portion of the access network, where the rest portion of the access network may include an Internet protocol (IP) network. The base station may also coordinate attribute management of the air interface. For example, the base station may be a base station (BTS, Base Transceiver Station) in GSM, or may be a base station (NodeB) in UMTS, or may be an evolved NodeB (NodeB, eNB, or e-NodeB, evolved Node B) in LTE, which is not limited in the this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the following, the preferred implementation manners of this application are described in detail with reference to the accompanying drawings.

Embodiment 1

Figure 2:
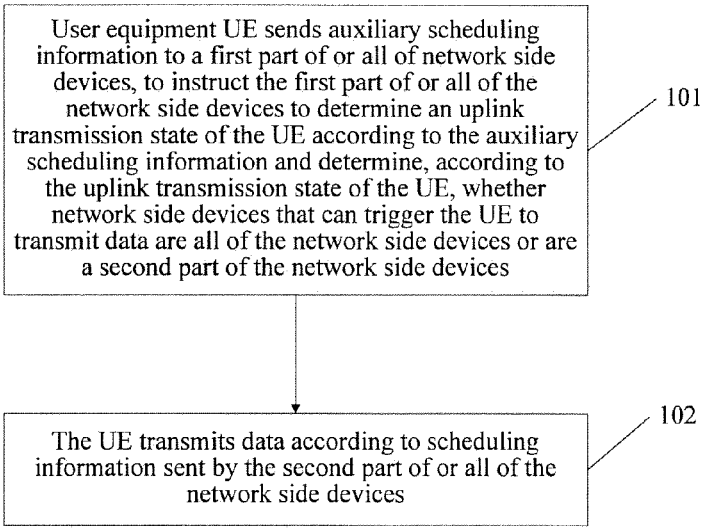
FIG. 2 is a flowchart of a data transmission method on a UE side according to an embodiment of this application.

This embodiment provides a data transmission method. Refer to FIG. 2, which is a flowchart of a data transmission method according to this embodiment, and the method includes:

Step 101: User equipment UE sends auxiliary scheduling information to a first part of or all network side devices, to instruct the first part of or all of the network side devices to determine an uplink transmission state of the UE according to the auxiliary scheduling information and determine, according to the uplink transmission state of the UE, whether network side devices that can trigger the UE to transmit data are all of the network side devices or are a second part of the network side devices.

Step 102: The UE transmits data according to scheduling information sent by the second part of or all of the network side devices.

In this embodiment, the uplink transmission state is a first uplink transmission state in which uplink data can be simultaneously transmitted on an uplink carrier corresponding to all of the network side devices, or is a second uplink transmission state in which uplink data can be simultaneously transmitted on an uplink carrier corresponding to the second part of the network side devices; and the network side device is a network side device that can communicate with the UE.

In an embodiment, when the uplink transmission state is the second uplink transmission state, the uplink data is simultaneously transmitted on the uplink carrier corresponding to the second part of the network side devices; herein, the second part of the network side devices may be devices relatively close to the UE, and because the devices are relatively close, a total power of the UE to these network side devices does not exceed a maximum transmit power of the UE. Certainly, in another embodiment, the second part of the network side devices herein may further be other network side devices, for example, devices relatively away from the UE, as long as an actual transmit power of the UE does not exceed the maximum transmit power.

Figure 3:
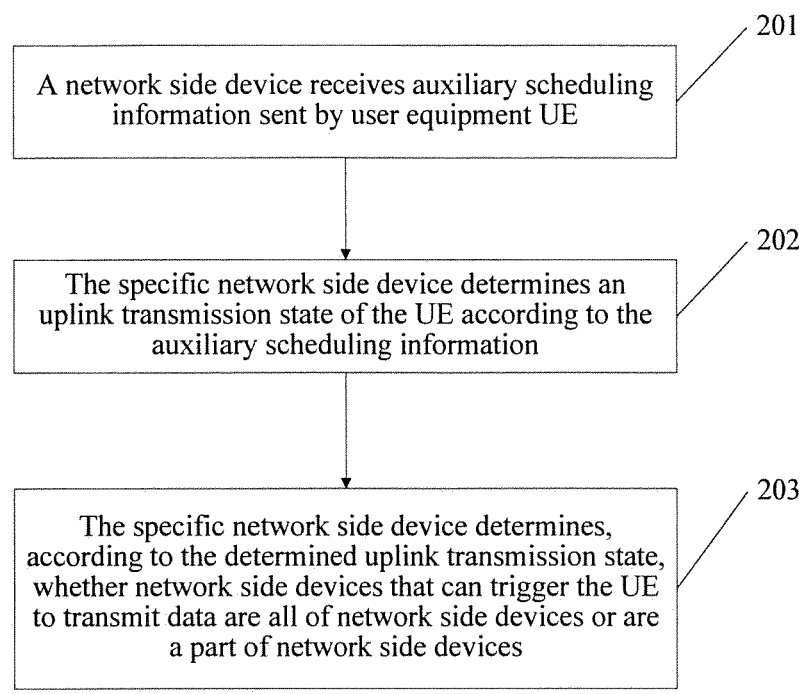
FIG. 3 is a flowchart of a data transmission method on a network side according to an embodiment of this application.

The method shown in FIG. 2 is described from the side of the user equipment, and further refer to FIG. 3, which is a method flowchart of the data transmission method according to this embodiment and on the side of the network side device, for example, a base station, a base station controller, and a relay. Refer to FIG. 3, the method includes:

Step 201: A network side device receives auxiliary scheduling information sent by user equipment UE.

Step 202: The network side device determines an uplink transmission state of the UE according to the auxiliary scheduling information.

Step 203: The network side device determines, according to the determined uplink transmission state, whether network side devices that can trigger the UE to transmit data are all network side devices or are a part of network side devices.

For ease of description, herein it should be further noted that, "the part of the network side devices" in description of a procedure from the side of the network side device in FIG. 3 and "the second part of the network side devices" in description of a procedure from the side of the user equipment in FIG. 2 are a same concept, and are generally referred to as "the second part of the network side devices" below.

The data transmission method in this embodiment is described in detail below with reference to FIG. 2 and FIG. 3.

First, refer to FIG. 2. User equipment (UE) first performs step 101, that is, the UE sends auxiliary scheduling information to a first part of or all of network side devices, so that the first part of or all of the network side devices determine an uplink transmission state of the UE according to the auxiliary scheduling information and determine, according to the uplink transmission state of the UE, whether network side devices that can trigger the UE to transmit data are all of the network side devices or are a second part of the network side devices. The corresponding network side device performs step 201: receives the auxiliary scheduling information sent by the UE. Then, the network side device performs step 202: the network side device determines the uplink transmission state of the UE according to the auxiliary scheduling information sent by the UE, and then performs step 203: the network side device determines, according to the determined uplink transmission state, whether the network side devices that can trigger the UE to transmit data are all of the network side devices or are the second part of the network side devices. Then all the network side devices or the second part of the network side devices may send scheduling information to the UE, to trigger the UE to transmit data, that is, to perform scheduling on the UE. Finally, the UE performs step 102: transmit data according to the scheduling information sent by the second part of or all of the network side devices.

First, examples are used to describe what type of information the auxiliary scheduling information may be. In an embodiment, the auxiliary scheduling information is specifically: indication information for indicating an uplink transmission state suggested by the UE, or indication information for indicating that the UE needs to switch an uplink transmission state, or may be power information.

(1) The indication information for indicating the uplink transmission state suggested by the UE. The UE may predetermine the suggested uplink transmission state by using the following steps: determining, by the UE, a transmit power of an uplink channel to be sent to each network side device, and determining the suggested uplink transmission state according to a sum of all determined transmit powers and a maximum transmit power of the UE. In this embodiment, the uplink channel includes a PUCCH, a PUSCH, a PRACH, and the like, but all of these channels do not need to be sent simultaneously. For example, the UE transmits the PUCCH but not the PUSCH to this network side device in the $n^{th}$ subframe, and may transmit the PUCCH and the PUSCH to this network side device in the $(n+1)^{th}$ subframe. It is similar for each of the network side devices. Therefore, in this embodiment, the UE determines the transmit power of the uplink channel to be sent to each network side device. For example, a sum of powers of uplink channels to be sent by the UE to each network side device that is at a specific moment, which may be a sum of powers of the PUCCH of a first network side device, the PUSCH of a second network side device, the PUCCH of a third network side device, and the like.

In an actual application, the determining, by the UE, a transmit power of an uplink channel to be sent to each network side device includes, but is not limited to, the following two implementation manners.

A first implementation manner is a rough estimation. The UE determines path losses according to downlink reference signals received from at least two network side devices, and determines, according to the determined path losses, the transmit power of the uplink channel to be sent to each network side device. For example, the UE obtains a transmission loss of a path between the base station and the UE by measuring downlink reference signals of at least two base stations. Therefore, in uplink sending of the UE, a threshold that the base station can correctly demodulate information about this channel needs to be reached when the channel arrives at the base station after at least the path loss is subtracted. In this way, a sum of transmit powers of all uplink channels to be sent by the UE to each network side device can be roughly obtained.

A second implementation manner is a relatively precise estimation. The UE determines, according to uplink transmit power adjustment commands received from at least two network side devices and a power adjustment solution on the uplink channel that is to be sent by the UE to each network side device, the transmit power of the uplink channel to be sent to each network side device.

In an embodiment, when a calculation result is that the sum of powers of the uplink channels that are to be sent by the UE to all of the network side devices exceeds the maximum transmit power of the UE, it is determined that the suggested uplink transmission state is a second uplink transmission state; or when a calculation result is that the sum of powers of the uplink channels that are to be sent by the UE to all of the network side devices does not exceed the maximum transmit power of the UE, it is determined that the suggested uplink transmission state is a first uplink transmission state.

In an embodiment, when a calculation result is that a quantity of times that the sum of powers of the uplink channels that are to be sent by the UE to all of the network side devices exceeds the maximum transmit power of the UE within a preset time period is less than a preset first threshold, it is determined that the suggested uplink transmission state is a first uplink transmission state; or when a calculation result is that the sum of powers of the uplink channels that are to be sent by the UE to all of the network side devices exceeds the maximum transmit power of the UE, it is determined that the suggested uplink transmission state is a second uplink transmission state, or when a calculation result is that a quantity of times that the sum of powers of the uplink channels that are to be sent by the UE to all of the network side devices exceeds the maximum transmit power of the UE within a preset time period is greater than a preset second threshold, it is determined that the suggested uplink transmission state is a second uplink transmission state.

Further, when determining that the suggested uplink transmission state is the second uplink transmission state, the UE further determine which network side devices the second part of the network side devices are. In an actual application, the second part of the network side devices may be divided into several groups. For example, the network side devices that communicate with the UE are Cell1, Cell2, Cell3, and Cell4. The UE determines that the suggested uplink transmission state is the second uplink transmission state, and the UE may simultaneously transmit uplink data on carriers of Cell1 and Cell3 or simultaneously transmit data on carriers of Cell2 and Cell4. A base station corresponding to Cell1 and Cell3 is in a first group of the network side devices, and a base station corresponding to Cell2 and Cell4 is in a second group of the network side devices.

Then, the auxiliary scheduling information is generated based on the foregoing suggested uplink transmission state. If the suggested uplink transmission state is the second uplink transmission state, the auxiliary scheduling information may further include identifier information of the second part of the network side devices, and the identifier information of the second part of the network side devices includes identifier information of at least one group of the network side devices.

(2) The indication information for indicating that the UE needs to switch an uplink transmission state. As described in the method in which the foregoing auxiliary scheduling information is the indication information for indicating the uplink transmission state suggested by the UE, however, in this embodiment, instead of providing the suggested uplink transmission state, the UE may generate, according to a calculation result, only indication information for indicating whether the UE needs to switch an uplink transmission state.

(3) Power information. The power information includes some or all of the following information: received powers of downlink reference signals that are received by the UE from all of the network side devices; values of transmission losses of paths from all of the network side devices to the UE; and power headroom that is obtained by comparing a sum of all transmit powers with a maximum transmit power. The UE may actively send the power information to the network side device, for example, send the power information periodically, or a network side device sends a triggering instruction to the UE, and then the UE sends the power information to the particular network side device.

As can be seen from this, a solution is to adjust the uplink transmission state of the UE when a total transmit power of the UE exceeds the maximum transmit power of the UE. For example, in the first uplink transmission state, if the total transmit power of the UE exceeds the maximum transmit power of the UE, the first uplink transmission state may be adjusted to the second uplink transmission state, instead of reducing a power of a signal sent to one or more network side devices; and in the second uplink transmission state, if there is enough headroom between the total transmit power of the UE and the maximum transmit power of the UE, the second uplink transmission state may be adjusted to the first uplink transmission state or a collection of a part of the network side devices in the second uplink transmission state is adjusted, so that a problem of ineffectiveness of data scheduling and transmission of a part of the network side devices on UE is resolved, and overall performance of a system is improved.

Secondly, examples are used to describe that user equipment (UE) sends auxiliary scheduling information to a first part of or all of network side devices, to instruct the first part of or all of the network side devices to determine an uplink transmission state of the UE according to the auxiliary scheduling information and determine, according to the uplink transmission state of the UE, whether network side devices that can trigger the UE to transmit data are all of the network side devices or are a second part of the network side devices, and determine an implementation manner for performing scheduling on the UE. In an embodiment, there are specifically multiple implementation manners for different scenarios and cases, which are described below by using examples.

First, refer to FIG. 2. User equipment (UE) first performs step 101, that is, the UE sends auxiliary scheduling information to a first part of or all of network side devices, so that the first part of or all of the network side devices determine an uplink transmission state of the UE according to the auxiliary scheduling information and determine, according to the uplink transmission state of the UE, whether network side devices that can trigger the UE to transmit data are all of the network side devices or are a second part of the network side devices. The corresponding network side device performs step 201, that is, receives the auxiliary scheduling information sent by the UE, then performs step 202, that is, the network side device determines the uplink transmission state of the UE according to the auxiliary scheduling information sent by the UE, and then performs step 203: the network side device determines, according to the determined uplink transmission state, whether the network side devices that can trigger the UE to transmit data are all of the network side devices or are the second part of the network side devices. Then all of the network side devices or the second part of the network side devices may send scheduling information to the UE, to trigger the UE to transmit data, that is, to perform scheduling on the UE. Finally, the UE performs step 102 of transmitting data according to the scheduling information sent by the second part of or all of the network side devices.

In a first scenario, the first part of the network side devices can control scheduling by another network side device. For example, in a scenario in which a macro base station (Macro eNodeB) and a micro base station (Pico eNodeB) are deployed, the micro base station may have no data packet, and a data packet transmitted by the micro base station is sent by the macro base station to the micro base station; and the macro base station may control physical layer scheduling by the micro base station on a specific data packet. Assuming that all the network side devices that currently communicate with the UE include Cell A of a macro base station, Cell B of a first micro base station, and Cell C of a second micro base station. For this case, there may be two cases:

(1) In a first case, the UE is in a first uplink transmission state.

The UE is currently in the first uplink transmission state, that is, the UE can simultaneously transmit uplink data on an uplink carrier corresponding to all of the network side devices, that is, transmit data on uplink carriers of CellA, CellB, and CellC. In this case, if the UE determines that data can be transmitted on uplink carriers of only a part of base stations at a same moment, and it is not suitable to simultaneously transmit data on uplink carriers of all base stations, the UE sends the auxiliary scheduling information to only the Macro base station, where the Macro base station is one of the first part of the network side devices. As described above, content of the auxiliary scheduling information may indicate that an uplink transmission state suggested by the UE is a second uplink transmission state. Further, the content of the auxiliary scheduling information may further include that the UE can transmit data on an uplink carrier of CellA or simultaneously transmit data on uplink carriers of CellB and CellC, which helps the network side device determine which network side devices the second part of the network side devices specifically are.

After receiving the auxiliary scheduling information, the macro base station may determine that the uplink transmission state of the UE is the second uplink transmission state, determine that the network side devices that can trigger the UE to transmit data are the second part of the network side devices, and determine a scheduling manner for the UE. The scheduling manner for the UE may be to ensure that data scheduling is performed on the UE in a manner that the UE does not need to simultaneously transmit uplink data on the uplink carriers of all of the network side devices. For example, all of the network side devices perform data scheduling on the UE in a time-division manner, that is, only a part of the network side devices can simultaneously perform scheduling, or in a manner that only the second part of the network side devices, that is, a fixed part of the network side devices, perform data scheduling on the UE, or the like. It should be noted that, the listed manners in which the network side device performs data scheduling on the UE are only exemplary, and an actual scheduling manner is not limited thereto. Further, which network side devices the second part of the network side devices may be and the scheduling manner may be determined according to identifier information of the second part of the network side devices that is in the received auxiliary scheduling information. For example, if the identifier information of the second part of the network side devices that is in the received auxiliary scheduling information means that "the UE may transmit data on the uplink carrier of CellA or simultaneously transmit data on the uplink carriers of CellB and CellC", the scheduling manner for the UE may be that CellA or CellB and CellC perform data scheduling on the UE in a time-division manner, or only CellA performs data scheduling on the UE, or only CellB and CellC perform data scheduling on the UE. The macro base station may notify another related base station, for example, the first micro base station and the second micro base station, of the determined data scheduling manner for the UE, so that the first micro base station and the second micro base station perform data scheduling on the UE in such a manner, and the UE transmits data according to the scheduling information sent by the network side devices.

Optionally, in this case of such a scenario, the UE may also send the auxiliary scheduling information to all of the macro base station, the first micro base station, and the second micro base station, or the UE may send the auxiliary scheduling information to the macro base station, and the macro base station then forwards this auxiliary scheduling information to the first micro base station and the second micro base station. As described above, content of the auxiliary scheduling information may indicate that an uplink transmission state suggested by the UE is the second uplink transmission state. Further, the content of the auxiliary scheduling information may further include that the UE can transmit data on the uplink carrier of CellA or simultaneously transmit data on the uplink carriers of CellB and CellC. The macro base station, the first micro base station, and the second micro base station use the uplink transmission state suggested by this UE as an uplink transmission state of the UE, and perform data scheduling on the UE according to the uplink transmission state of the UE. A manner of performing data scheduling on the UE is described above, and is not described herein again. The UE transmits data according to the scheduling information sent by the network side devices.

Optionally, the macro base station, the first micro base station, and the second micro base station may also determine an uplink sending state of the UE and a scheduling manner for the UE by means of negotiation, and perform data scheduling on the UE according to a negotiated result. The UE transmits data according to the scheduling information sent by the network side devices.

(2) In a second case, the UE is in a second uplink transmission state.

There are two possibilities:

a) For a first possibility, the UE is currently in the second uplink transmission state, that is, the UE can simultaneously transmit uplink data on only an uplink carrier corresponding to a part of the network side devices, and a current scheduling manner of the network side devices for the UE may be to ensure that data scheduling is performed on the UE in a manner that the UE does not need to simultaneously transmit uplink data on uplink carriers of all of the network side devices. In this case, if the UE determines that there is enough headroom between an uplink transmit power of the UE and a maximum transmit power, for example, the uplink transmit power of the UE does not exceed the maximum transmit power or a quantity of times that the uplink transmit power of the UE exceeds the maximum transmit power of the UE within a preset time period is less than a preset first threshold, the UE may consider that the UE can simultaneously transmit uplink data on the uplink carrier corresponding to all of the network side devices. Therefore, the UE sends the auxiliary scheduling information to a macro base station, where content of the auxiliary scheduling information may indicate that an uplink transmission state suggested by the UE is a first uplink transmission state.

After receiving the auxiliary scheduling information, the macro base station may determine that the uplink transmission state of the UE is the first uplink transmission state, determine that the network side devices that can trigger the UE to transmit data are all of the network side devices, and determine a scheduling manner for the UE. The scheduling manner for the UE may be that all of the network side devices perform data scheduling on the UE, and there is no limitation. For example, all of the network side devices may perform data scheduling on the UE at any moment. The macro base station may notify another related base station, for example, a first micro base station and a second micro base station, of the determined data scheduling manner for the UE, so that the first micro base station and the second micro base station perform data scheduling on the UE in such a manner, and the UE transmits data according to the scheduling information sent by the network side devices.

Optionally, in such a possibility of such a case of such a scenario, the UE may also send the auxiliary scheduling information to all of the macro base station, the first micro base station, and the second micro base station, or the UE may send the auxiliary scheduling information to the macro base station, and the macro base station then forwards this auxiliary scheduling information to the first micro base station and the second micro base station. As described above, content of the auxiliary scheduling information may indicate that an uplink transmission state suggested by the UE is the first uplink transmission state. The macro base station, the first micro base station, and the second micro base station use the uplink transmission state suggested by this UE as an uplink transmission state of the UE, and perform data scheduling on the UE according to the uplink transmission state of the UE. A manner of performing data scheduling on the UE is described above, and is not described herein again. The UE transmits data according to the scheduling information sent by the network side devices.

Optionally, the macro base station, the first micro base station, and the second micro base station may also determine an uplink sending state of the UE and a scheduling manner for the UE by means of negotiation, and perform data scheduling on the UE according to a negotiated result. The UE transmits data according to the scheduling information sent by the network side devices.

b) For a second possibility, the UE is currently in the second uplink transmission state, that is, the UE only can simultaneously transmit uplink data on an uplink carrier corresponding to a part of the network side devices, and a current scheduling manner of the network side devices for the UE may be to ensure that data scheduling is performed on the UE in a manner that the UE does not need to simultaneously transmit uplink data on uplink carriers of all of the network side devices. In this case, if the UE determines, according to a comparison between an uplink transmit power of the UE and a maximum transmit power, that the UE can simultaneously transmit uplink data on an uplink carrier corresponding to CellB and CellC, but cannot simultaneously transmit uplink data on an uplink carrier corresponding to CellA, CellB, and CellC, the UE sends the auxiliary scheduling information to a macro base station, where content of the auxiliary scheduling information may indicate that an uplink transmission state suggested by the UE is the second uplink transmission state, and the UE can transmit data on an uplink carrier of CellA or simultaneously transmit data on uplink carriers of CellB and CellC.

After receiving the auxiliary scheduling information, the macro base station may determine that the uplink transmission state of the UE is the second uplink transmission state, determine that the network side devices that can trigger the UE to transmit data are the second part of the network side devices, and determine a scheduling manner for the UE. The scheduling manner for the UE may be that CellA or CellB and CellC perform data scheduling on the UE in a time-division manner, or only CellA performs data scheduling on the UE, or CellB and CellC perform data scheduling on the UE. The macro base station may notify another related base station, for example, the first micro base station and the second micro base station, of the determined data scheduling manner for the UE, so that the first micro base station and the second micro base station perform data scheduling on the UE in such a manner.

Optionally, in such a possibility of such a case of such a scenario, the UE may also send the auxiliary scheduling information to all of the macro base station, the first micro base station, and the second micro base station, or the UE may send the auxiliary scheduling information to the macro base station, and the macro base station then forwards this auxiliary scheduling information to the first micro base station and the second micro base station. As described above, content of the auxiliary scheduling information may indicate that an uplink transmission state suggested by the UE is the second uplink transmission state, and the UE can transmit data on an uplink carrier of CellA or simultaneously transmit data on uplink carriers of CellB and CellC. The macro base station, the first micro base station, and the second micro base station use the uplink transmission state suggested by this UE as an uplink transmission state of the UE, and perform data scheduling on the UE according to the uplink transmission state of the UE. A manner of performing data scheduling on the UE is described above, and is not described herein again. The UE transmits data according to the scheduling information sent by the network side devices.

Optionally, the macro base station, the first micro base station, and the second micro base station may also determine an uplink sending state of the UE and a scheduling manner for the UE by means of negotiation, and perform data scheduling on the UE according to a negotiated result. The UE transmits data according to the scheduling information sent by the network side devices.

In a second scenario, each network side device masters scheduling by the network side device. For example, in a scenario in which a macro base station (Macro eNodeB) and a micro base station (Pico eNodeB) are deployed, the micro base station has its own data packet that needs to be sent, and may also autonomously determine physical layer scheduling on a data packet instead of completely relying on an instruction from the macro base station. Assuming that all the network side devices that currently communicate with the UE include CellA of a macro base station, CellB of a first micro base station, and CellC of a second micro base station. For this case, there may be two cases:

(1) In a first case, the UE is in a first uplink transmission state.

The UE is currently in the first uplink transmission state, that is, the UE can simultaneously transmit uplink data on an uplink carrier corresponding to all of the network side devices, that is, transmit data on uplink carriers of CellA, CellB, and CellC. In this case, if the UE determines that data can be transmitted on uplink carriers of only a part of base stations at a same moment, and it is not suitable to simultaneously transmit data on uplink carriers of all base stations, the UE sends the auxiliary scheduling information to all of the macro base station, the first micro base station, and the second micro base station. As described above, content of the auxiliary scheduling information may indicate that an uplink transmission state suggested by the UE is a second uplink transmission state. Further, the content of the auxiliary scheduling information may further include that the UE can transmit data on an uplink carrier of CellA or simultaneously transmit data on uplink carriers of CellB and CellC.

The macro base station, the first micro base station, and the second micro base station use the uplink transmission state suggested by this UE as an uplink transmission state of the UE, and determine that the network side devices that can trigger the UE to transmit data are the second part of the network side devices, and determine a scheduling manner for the UE. The scheduling manner for the UE may be to ensure that data scheduling is performed on the UE in a manner that the UE does not need to simultaneously transmit uplink data on the uplink carriers of all of the network side devices, that is, only the second part of the network side devices may simultaneously perform data scheduling. For example, all of the network side devices perform data scheduling on the UE in a time-division manner, or in a manner that only the second part of the network side devices, that is, the fixed second part of the network side devices, perform data scheduling on the UE, or the like. It should be noted that, the listed manners in which the network side device performs data scheduling on the UE are only exemplary, and an actual scheduling manner is not limited thereto. Further, which network side devices the second part of the network side devices specifically are and the specific scheduling manner for the UE may be determined according to identifier information of the second part of the network side devices that is in the received auxiliary scheduling information. For example, if the identifier information of the second part of the network side devices that is in the received auxiliary scheduling information is that "the UE may transmit data on the uplink carrier of CellA or simultaneously transmit data on the uplink carriers of CellB and CellC", scheduling is performed on the UE according to the information. The scheduling manner for the UE may be that CellA or CellB and CellC perform data scheduling on the UE in a time-division manner, or only CellA performs data scheduling on the UE, or CellB and CellC perform data scheduling on the UE. The UE transmits data according to the scheduling info illation sent by the network side devices.

Optionally, after receiving the auxiliary scheduling information sent by the UE, the macro base station, the first micro base station, and the second micro base station may also determine an uplink sending state of the UE and a scheduling manner for the UE by means of negotiation, and perform data scheduling on the UE according to a negotiated result. The UE transmits data according to the scheduling information sent by the network side devices.

(2) In a second case, the UE is in a second uplink transmission state.

There are two possibilities:

a) For a first possibility, the UE is currently in the second uplink transmission state, that is, the UE only can simultaneously transmit uplink data on an uplink carrier corresponding to a part of the network side devices, and a current scheduling manner of the network side devices for the UE may be to ensure that data scheduling is performed on the UE in a manner that the UE does not need to simultaneously transmit uplink data on uplink carriers of all of the network side devices. In this case, if the UE determines that there is enough headroom between an uplink transmit power of the UE and a maximum transmit power, the UE may consider that the UE can simultaneously transmit uplink data on the uplink carrier corresponding to all of the network side devices, and the UE sends the auxiliary scheduling information to all of the macro base station, the first micro base station, and the second micro base station. Content of the auxiliary scheduling information may indicate that an uplink transmission state suggested by the UE is a first uplink transmission state.

After receiving the auxiliary scheduling information sent by the UE, the macro base station, the first micro base station, and the second micro base station may determine that the uplink transmission state of the UE is the first uplink transmission state, determine that the network side devices that can trigger the UE to transmit data are all of the network side devices, and determine a scheduling manner for the UE. The scheduling manner for the UE may be that all of the network side devices perform data scheduling on the UE, and there is no limitation. For example, all of the network side devices may perform data scheduling on the UE at any moment. The UE transmits data according to the scheduling information of the network side devices.

Optionally, after receiving the auxiliary scheduling information sent by the UE, the macro base station, the first the micro base station, and the second micro base station may also determine an uplink sending state of the UE and a scheduling manner for the UE by means of negotiation, and perform data scheduling on the UE according to a negotiated result. The UE transmits data according to the scheduling information sent by the network side devices.

b) For a second possibility, the UE is currently in the second uplink transmission state, that is, the UE only can simultaneously transmit uplink data on an uplink carrier corresponding to a part of the network side devices, and a current scheduling manner of the network side devices for the UE may be to ensure that data scheduling is performed on the UE in a manner that the UE does not need to simultaneously transmit uplink data on uplink carriers of all of the network side devices. In this case, if the UE determines, according to a comparison between an uplink transmit power of the UE and a maximum transmit power, that the UE can simultaneously transmit uplink data on an uplink carrier corresponding to CellB and CellC, but cannot simultaneously transmit uplink data on an uplink carrier corresponding to CellA, CellB, and CellC. Content of the auxiliary scheduling information may indicate that an uplink transmission state suggested by the UE is the second uplink transmission state, and the UE can transmit data on an uplink carrier of CellA or simultaneously transmit data on uplink carriers of CellB and CellC.

After receiving the auxiliary scheduling information sent by the UE, the macro base station, the first micro base station, and the second micro base station may determine that the uplink transmission state of the UE is the second uplink transmission state, determine that the network side devices that can trigger the UE to transmit data are the second part of the network side devices, and determine a scheduling manner for the UE. The scheduling manner for the UE may be that CellA or CellB and CellC perform data scheduling on the UE in a time-division manner, or only CellA performs data scheduling on the UE, or CellB and CellC perform data scheduling on the UE. The UE transmits data according to the scheduling information sent by the network side devices.

Optionally, after receiving the auxiliary scheduling information sent by the UE, the macro base station, the first the micro base station, and the second micro base station may also determine an uplink sending state of the UE and a scheduling manner for the UE by means of negotiation, and perform data scheduling on the UE according to a negotiated result. The UE transmits data according to the scheduling information sent by the network side devices.

It should be noted that, the foregoing embodiment describes only possible implementation manners for the possible network side devices and user equipments in the cases of the foregoing scenarios, and implementation manners that can be used for the possible network side devices and user equipments in the cases of the foregoing scenarios are not limited thereto. In a specific implementation process, when the auxiliary scheduling information is indication information for indicating an uplink transmission state suggested by the UE or indication information for indicating that the UE needs to switch an uplink transmission state, the network side device determines an uplink transmission state of the UE according to the indication information sent by the UE, for example, determines an uplink transmission state of the UE according to the uplink transmission state suggested by the UE, or requires the UE to report power information according to the indication information, and then the network side device further determines an uplink transmission state of the UE according to the power information.

When the auxiliary scheduling information is power information, the network side device determines an uplink transmission state of the UE according to the power information sent by the UE. For example, the network side device may determine, according to the power information, whether a sum of transmit powers of uplink channels to be sent to all of the network side devices exceeds a maximum transmit power of the UE, or whether a quantity of times that a sum of transmit powers of uplink channels to be sent exceeds a maximum transmit power of the UE within a preset time period is less than a preset first threshold or is greater than a preset second threshold, then determine the uplink transmission state of the UE, and when the sum of transmit powers of the uplink channels that are to be sent by the UE to all of the network side devices exceeds the maximum transmit power of the UE, determine that the uplink transmission state of the UE is a second uplink transmission state. Further, the network side may determine, according to the transmit powers of the uplink channels to be sent to each network side device, which network side device or which network side devices the second part of the network side devices in the second uplink transmission state are. When the sum of powers of the uplink channels that are to be sent by the UE to all of the network side devices does not exceed the maximum transmit power of the UE, or if a current uplink transmission state of the UE is the second transmission state, and when a calculation result is that the quantity of times that the sum of powers of the uplink channels that are to be sent by the UE to all of the network side devices exceeds the maximum transmit power of the UE within the preset time period is less than the preset first threshold, it is determined that the uplink transmission state of the UE is a first uplink transmission state; or when the sum of powers of the uplink channels that are to be sent by the UE to all of the network side devices exceeds the maximum transmit power of the UE, or if a current uplink transmission state of the UE is a first transmission state, and when a calculation result is that the quantity of times that the sum of powers of the uplink channels that are to be sent by the UE to all of the network side devices exceeds the maximum transmit power of the UE within the preset time period is greater than the preset second threshold, it is determined that the suggested uplink transmission state is the second uplink transmission state.

As described in the foregoing embodiment, when the auxiliary scheduling information sent by the UE is sent to only a related first part of base stations, and the related first part of the base stations determine an uplink sending state of the UE and determine whether network side devices that can trigger the UE to transmit data are the second part of the network side devices or all of the network side devices, and a scheduling manner for the UE, the first part of the base stations may switch the determined uplink sending state of the UE and the scheduling manner for the UE to another base station, so that the another base station determines the uplink sending state of the UE and performs scheduling on the UE according to the determined scheduling manner for the UE.

Further, when the auxiliary scheduling information sent by the UE can be sent to only a related first part of base stations, and other base stations may not know the auxiliary scheduling information of the UE, the base stations receiving the auxiliary scheduling information may switch the auxiliary scheduling information of the UE to the other base stations. Then all base stations determine an uplink sending state of the UE and a scheduling manner for the UE by means of negotiation.

Correspondingly, the UE performs step 102, that is, the UE transmits data according to the scheduling information of the second part of or all of the network side devices.

In a further embodiment, after Step 202, the network side device further notifies the UE to perform switching of the uplink transmission state and/or determine the scheduling manner for the UE. Because of the switching of the uplink transmission state, some conducts of the UE after the UE receives or transmits data may be affected. For example, after the UE learns the switching of the uplink transmission state, some mechanisms in which the UE sends an ACK/NACK to the base station may be affected.

For example, if the UE is in the first uplink transmission state, the uplink transmission state needs to be switched to the second transmission state currently. When the UE is in the second transmission state, all of the network side devices may still simultaneously schedule downlink data for the UE, and ACK/NACK feedback information of the downlink data transmitted by these network side devices may be bound by the UE (performing a logical AND operation on the HARQ-ACK feedback information) or the UE divides one uplink time unit into multiple time groups, and HARQ-ACK information is fed back to the network side devices by using resources in the time groups in a time-division manner. For example, in an LTE system, two base stations, that is, a macro base station and a micro base station, communicate with the UE; and when the UE is in the second transmission state, the macro base station and the micro base station simultaneously perform scheduling to send downlink data to the UE, and the UE may separately use two timeslots in one uplink subframe of the UE of the LTE system to feed back HARQ-ACK information to the macro base station and the micro base station. In these cases, the UE needs to learn the uplink transmission state, determined by the network side device, of the UE.

As can be seen from the foregoing description, in this embodiment of this application, first, because UE not only may work in a first uplink transmission state, that is, transmit uplink data on an uplink carrier corresponding to all network side devices, but also may work in a second uplink transmission state, that is, transmit uplink data on an uplink carrier corresponding to a part of the network side devices, when a total transmit power of the UE exceeds a maximum transmit power of the UE, the problem may be resolved by adjusting an uplink transmission state of the UE. For example, in the first uplink transmission state, if the total transmit power of the UE exceeds the maximum transmit power of the UE, the first uplink transmission state may be adjusted to the second uplink transmission state, instead of reducing a power of a signal sent to one or more network side devices; and in the second uplink transmission state, if there is enough headroom between the total transmit power of the UE and the maximum transmit power of the UE, the second uplink transmission state may be adjusted to the first uplink transmission state or a collection of a part of the network side devices in the second uplink transmission state is adjusted, so that a problem of ineffectiveness of data scheduling and transmission of apart of the network side devices on UE is resolved, and overall performance of a system is improved. Secondly, the UE sends auxiliary scheduling information to the network side device, and the network side device can determine, based on the auxiliary scheduling information, the uplink transmission state of the UE, and perform scheduling on the UE according to the uplink transmission state of the UE; therefore, the uplink transmission state of the UE can be adjusted in time according to a status of the UE, and overall performance of a system can be ensured.

Figure 4:
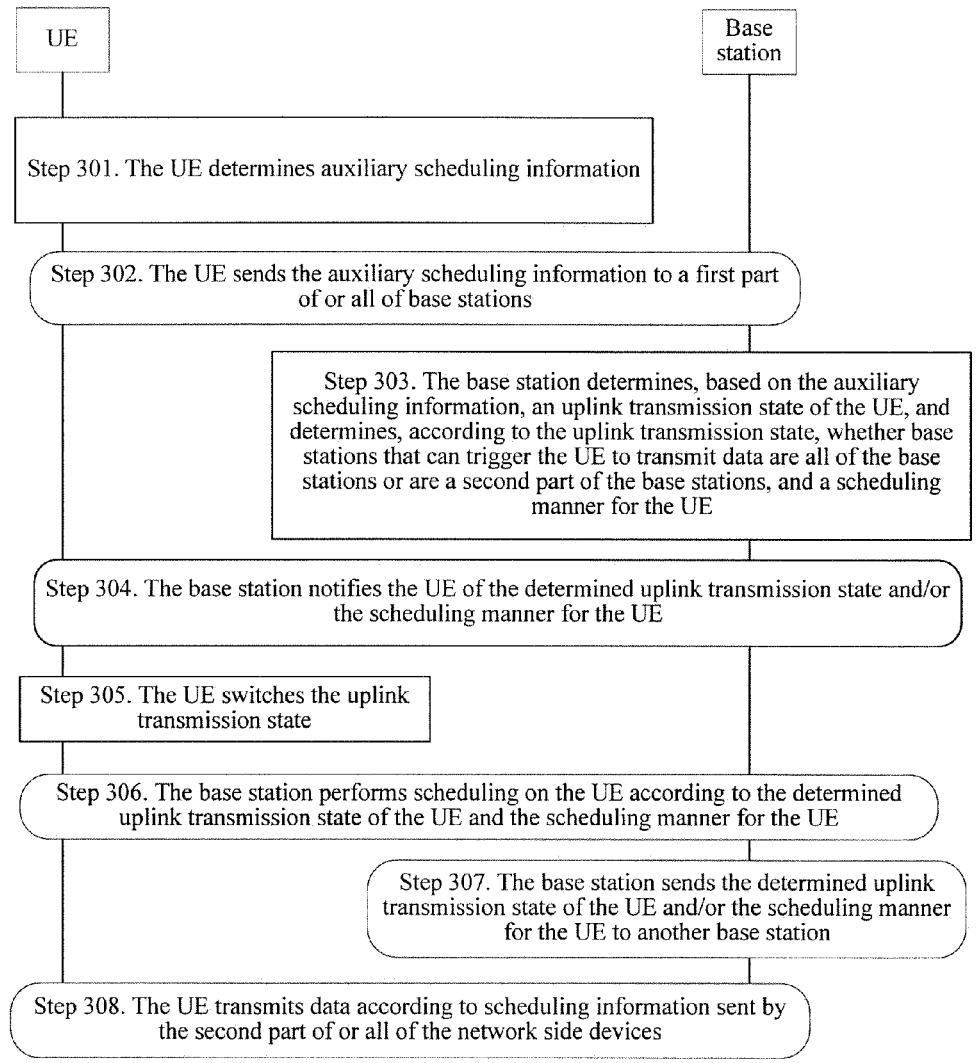
FIG. 4 is a schematic diagram of a specific example of a data transmission method according to an embodiment of this application.

Next, refer to FIG. 4, which is a specific example of the data transmission method according to an embodiment of this application, where a network side device is, for example, a base station. The method includes:

Step 301: UE determines auxiliary scheduling information. The auxiliary scheduling information may be information for indicating an uplink transmission state suggested by the UE, or indication information for indicating that the UE needs to switch an uplink transmission state, or power information.

Step 302: The UE sends the auxiliary scheduling information to a first part of or all of base stations.

Step 303: A base station determines, based on the auxiliary scheduling information, an uplink transmission state of the UE, and determines, according to the uplink transmission state, whether base stations that can trigger the UE to transmit data are all of the base stations or are a second part of the base stations, and a scheduling manner for the UE. The uplink transmission state of the UE and the scheduling manner for the UE may be determined by the first part of the base stations, or the uplink transmission state of the UE and the scheduling manner for the UE may be determined by all of the base stations by means of negotiation.

Step 304: The base station notifies the UE of the determined uplink transmission state and/or the scheduling manner for the UE, and correspondingly, the UE performs step 305.

Step 305: The UE performs switching of the uplink transmission state, for example, switches the uplink transmission state to a second uplink transmission state.

Step 306: The base station performs scheduling on the UE according to the determined uplink transmission state of the UE and the scheduling manner for the UE.

Step 307: The base station sends the determined uplink transmission state of the UE and/or the scheduling manner for the UE to another base station, so that the another base station performs scheduling on the UE according to the determined uplink transmission state, for example, forwards the determined uplink transmission state of the UE and/or the scheduling manner for the UE to another related base station, so that the another related base station may also perform scheduling on the UE.

Step 308: The UE transmits data according to scheduling information sent by the second part of or all of the network side devices.

A sequence in which step 304 and step 307 are performed may be changed according to an actual situation, and step 304 and step 307 may be simultaneously performed or may not be simultaneously performed.

Embodiment 2

Figure 5:
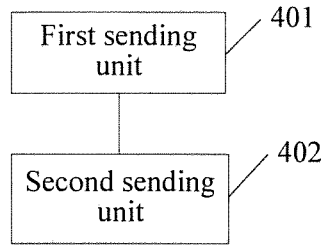
FIG. 5 is a functional block diagram of user equipment according to Embodiment 2 of this application.

This embodiment of this application further provides user equipment. Referring to FIG. 5, the user equipment includes: a first sending unit 401, configured to send auxiliary scheduling information to a first part of or all of network side devices, to instruct the first part of or all of the network side devices to determine an uplink transmission state of the user equipment UE according to the auxiliary scheduling information and determine, according to the uplink transmission state of the UE, whether network side devices that can trigger the UE to transmit data are all of the network side devices or are a second part of the network side devices, where the uplink transmission state is a first uplink transmission state in which uplink data can be simultaneously transmitted on an uplink carrier corresponding to all of the network side devices, or is a second uplink transmission state in which uplink data can be simultaneously transmitted on an uplink carrier corresponding to the second part of the network side devices; and a second sending unit 402, configured to transmit data according to scheduling information sent by the second part of or all of the network side devices. The network side device is a network side device that can communicate with the UE.

The auxiliary scheduling information is specifically: indication information for indicating an uplink transmission state suggested by the UE or indicating that the UE needs to switch an uplink transmission state; or power information. The power information may include at least one of: received powers of downlink reference signals that are received by the UE from all of the network side devices; values of transmission losses of paths from all of the network side devices to the UE; and power headroom that is obtained by comparing a sum of transmit powers of uplink channels to be sent to all of the network side devices with a maximum transmit power of the UE.

Further, when the uplink transmission state suggested by the UE is the second uplink transmission state, the auxiliary scheduling information further includes identifier information of the second part of the network side devices.

In a further embodiment, the user equipment further includes: a determining unit, configured to determine a transmit power of an uplink channel to be sent to each network side device, and determine, according to a sum of all determined transmit powers and a maximum transmit power of the UE, the suggested uplink transmission state or that the UE needs to switch an uplink transmission state.

Optionally, the determining unit is specifically configured to: if a current uplink transmission state of the UE is the second transmission state, compare, with a preset first threshold, a quantity of times that the sum of the transmit powers exceeds the maximum transmit power within a preset time period, and if the quantity of times within the preset time period is less than the preset first threshold, determine that the suggested uplink transmission state is the first uplink transmission state; or determine that the uplink transmission state of the UE needs to be switched from the first transmission state to the second transmission state; or if a current uplink transmission state of the UE is the first transmission state, compare, with a preset second threshold, a quantity of times that the sum of the transmit powers exceeds the maximum transmit power within a preset time period, and if the quantity of times within the preset time period is greater than the preset second threshold, determine that the suggested uplink transmission state is the second uplink transmission state; or determine that the uplink transmission state of the UE needs to be switched from the first transmission state to the second transmission state.

In an actual application, the determining unit is specifically configured to determine path losses according to downlink reference signals received from at least two network side devices, and determine, according to the determined path losses, the transmit power of the uplink channel to be sent to each network side device; or determine, according to uplink transmit power adjustment commands received from at least two network side devices and a power adjustment solution on the uplink channel that is to be sent by the UE to each network side device, the transmit power of the uplink channel to be sent to each network side device.

With reference to the foregoing embodiments, the first sending unit 401 is specifically configured to: when the first part of the network side devices can control scheduling by another network side device, send the auxiliary scheduling information to the first part of the network side devices.

Variations and specific examples of the data transmission method in the embodiments of FIG. 2 and FIG. 3 are also applicable to the user equipment in this embodiment. According to the foregoing detailed descriptions of the data transmission method, a person skilled in the art may clearly understand an implementation method of the user equipment in this embodiment; therefore, for brevity of the specification, details are not described herein again.

Embodiment 3

Figure 6:
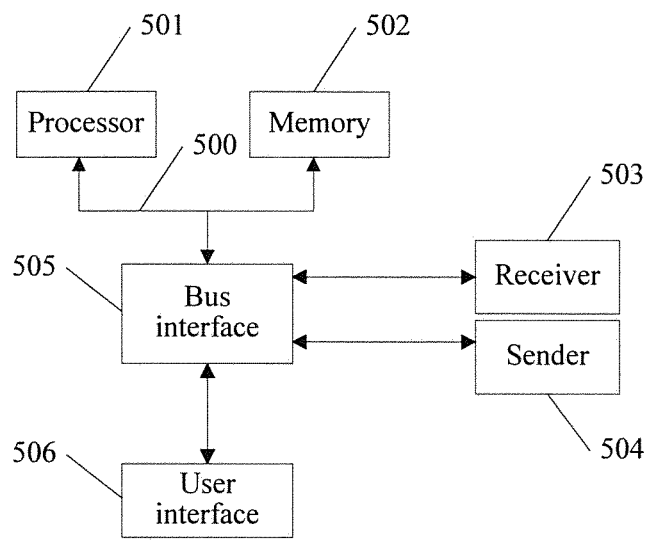
FIG. 6 is a concept diagram of an example of hardware implementation of user equipment according to Embodiment 3 of this application.

This embodiment provides user equipment. Refer to FIG. 6, which is a concept diagram of an example of hardware implementation of the user equipment. The user equipment includes: a sender 504, configured to send auxiliary scheduling information to a first part of or all of network side devices, to instruct the first part of or all of the network side devices to determine an uplink transmission state of the user equipment UE according to the auxiliary scheduling information and determine, according to the uplink transmission state of the UE, whether network side devices that can trigger the UE to transmit data are all of the network side devices or are a second part of the network side devices, where the uplink transmission state is a first uplink transmission state in which uplink data can be simultaneously transmitted on an uplink carrier corresponding to all of the network side devices, or is a second uplink transmission state in which uplink data can be simultaneously transmitted on an uplink carrier corresponding to the second part of the network side devices; and further configured to transmit data according to scheduling information sent by the second part of or all of the network side devices; and a processor 501, configured to process data before the sender 504 transmits the data. The network side device is a network side device that can communicate with the UE.

In FIG. 6, in a bus architecture (represented by a bus 500), the bus 500 may include any quantity of interconnected buses and bridges, and the bus 500 connects various circuits including one or more processors represented by a processor 501 and memories represented by a memory 502. The bus 500 may further connect various other circuits such as a peripheral device, a voltage stabilizer, and a power management circuit. These are known in the art, and therefore are not further described in this specification. A bus interface 505 provides an interface between the bus 500 and a receiver 503 and between the bus 500 and a sender 504. The receiver 503 and the sender 504 may be a same element, that is, a transceiver, providing a unit configured to communicate with various other apparatuses on a transmission medium. Depending on the user equipment, a user interface 506, for example, a keypad, a display, a loudspeaker, a microphone, and a joystick, may be further provided.

The processor 501 is responsible for managing the bus 500 and general processing, and the memory 502 may be configured to store data that is to be used when the processor 501 performs an operation.

The auxiliary scheduling information is specifically: indication information for indicating an uplink transmission state suggested by the UE or indicating that the UE needs to switch an uplink transmission state; or power information. The power information may include at least one of: received powers of downlink reference signals that are received by the UE from all of the network side devices; values of transmission losses of paths from all of the network side devices to the UE; and power headroom that is obtained by comparing a sum of transmit powers of uplink channels to be sent to all of the network side devices with a maximum transmit power of the UE.

Further, when the uplink transmission state suggested by the UE is a second uplink transmission state, the auxiliary scheduling information further includes identifier information of the second part of the network side devices.

In a further embodiment, the processor 501 is configured to determine a transmit power of an uplink channel to be sent to each network side device, and determine, according to a sum of all determined transmit powers and a maximum transmit power of the UE, the suggested uplink transmission state or that the UE needs to switch an uplink transmission state.

In an embodiment, the processor 501 is specifically configured to: if a current uplink transmission state of the UE is the second transmission state, compare, with a preset first threshold, a quantity of times that the sum of the transmit powers exceeds the maximum transmit power within a preset time period, and if the quantity of times within the preset time period is less than the preset first threshold, determine that the suggested uplink transmission state is the first uplink transmission state; or determine that the uplink transmission state of the UE needs to be switched from the first transmission state to the second transmission state; or if a current uplink transmission state of the UE is the first transmission state, compare, with a preset second threshold, a quantity of times that the sum of the transmit powers exceeds the maximum transmit power within a preset time period, and if the quantity of times within the preset time period is greater than the preset second threshold, determine that the suggested uplink transmission state is the second uplink transmission state; or determine that the uplink transmission state of the UE needs to be switched from the first transmission state to the second transmission state.

In another embodiment, the processor 501 is specifically configured to determine path losses according to downlink reference signals received from at least two network side devices, and determine, according to the determined path losses, the transmit power of the uplink channel to be sent to each network side device; or determine, according to uplink transmit power adjustment commands received from at least two network side devices and a power adjustment solution on the uplink channel that is to be sent by the UE to each network side device, the transmit power of the uplink channel to be sent to each network side device.

With reference to the foregoing embodiments, the sender 504 is specifically configured to: when the first part of the network side devices can control scheduling by another network side device, send the auxiliary scheduling information to the first part of the network side devices.

Variations and specific examples of the data transmission method in the embodiments of FIG. 2 and FIG. 3 are also applicable to the user equipment in this embodiment. According to the foregoing detailed descriptions of the data transmission method, a person skilled in the art may clearly understand an implementation method of the user equipment in this embodiment; therefore, for brevity of the specification, details are not described herein again.

Embodiment 4

Figure 7:
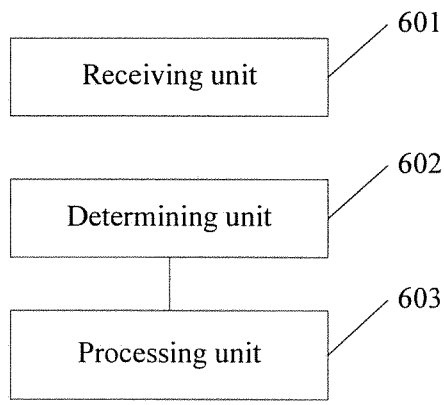
FIG. 7 is a functional block diagram of a network side device according to Embodiment 4 of this application.

This embodiment provides a network side device. Refer to FIG. 7, the network side device includes:

a receiving unit 601, configured to receive auxiliary scheduling information sent by user equipment UE; a determining unit 602, configured to determine an uplink transmission state of the UE according to the auxiliary scheduling information, where the uplink transmission state is a first uplink transmission state in which uplink data can be simultaneously transmitted on an uplink carrier corresponding to all network side devices, or is a second uplink transmission state in which uplink data can be simultaneously transmitted on an uplink carrier corresponding to a part of network side devices; and a processing unit 603, configured to determine, according to the determined uplink transmission state, whether network side devices that can trigger the UE to transmit data are all of the network side devices or are the part of the network side devices. The network side device is a network side device that can communicate with the UE.

Further, the determining unit 602 is specifically configured to determine the uplink transmission state of the UE according to power information sent by the UE; or determine the uplink transmission state of the UE according to indication information sent by the UE, where the indication information is used to indicate an uplink transmission state suggested by the UE or indicate that the UE needs to switch an uplink transmission state.

In a further embodiment, the determining unit 602 is specifically configured to determine, by the network side device, according to the power information, a transmit power of an uplink channel that is to be sent by the UE to each network side device; and determine the uplink transmission state of the UE according to a sum of all determined transmit powers and a maximum transmit power of the UE.

Further, the determining unit 602 is specifically configured to: if a current uplink transmission state of the UE is the second transmission state, compare, with a preset first threshold, a quantity of times that the sum of the transmit powers exceeds the maximum transmit power within a preset time period, and if the quantity of times within the preset time period is less than the preset first threshold, determine that the uplink transmission state of the UE is the first uplink transmission state; or if a current uplink transmission state of the UE is the first transmission state, compare, with a preset second threshold, a quantity of times that the sum of the transmit powers exceeds the maximum transmit power within a preset time period, and if the quantity of times within the preset time period is greater than the preset second threshold, determine that the uplink transmission state of the UE is the second uplink transmission state.

When the uplink transmission state suggested by the UE is the second uplink transmission state, the auxiliary scheduling information further includes identifier information of the part of the network side devices.

Further, the determining unit 602 is further configured to determine scheduling manners of all of the network side devices or the part of the network side devices for the UE.

In a further embodiment, the network side device further includes: a first sending unit, configured to notify the UE of the uplink transmission state determined by the network side device and the scheduling manner for the UE.

In another embodiment, the network side device further includes: a second sending unit, configured to forward the determined uplink transmission state and the scheduling manner for the UE to another network side device, and notify the another network side device to trigger, according to the determined uplink transmission state and the scheduling manner for the UE, the UE to transmit data.

In still another embodiment, the network side device further includes: a third sending unit, configured to forward, to another network side device, the auxiliary scheduling information sent by the UE.

Variations and specific examples of the data transmission method in the embodiments of FIG. 2 and FIG. 3 are also applicable to the network side device in this embodiment. According to the foregoing detailed descriptions of the data transmission method, a person skilled in the art may clearly understand an implementation method of the network side device in this embodiment; therefore, for brevity of the specification, details are not described herein again.

Embodiment 5

Figure 8:
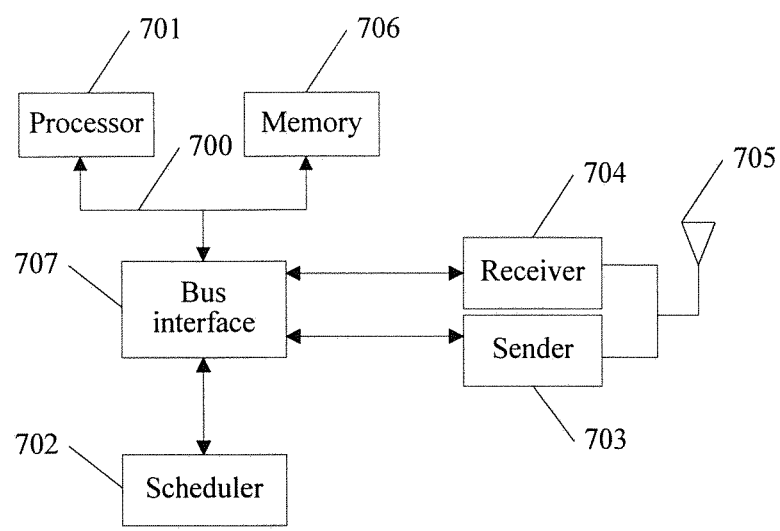
FIG. 8 is a concept diagram of an example of hardware implementation of a network side device according to Embodiment 5 of this application.

This embodiment provides a network side device. Refer to FIG. 8, which is a block diagram of hardware implementation of the network side device, where the network side device may be specifically a base station, a base station controller, or a relay. The network side device includes:

a receiver 704, configured to receive auxiliary scheduling information sent by user equipment UE; and a processor 701, configured to determine an uplink transmission state of the UE according to the auxiliary scheduling information, where the uplink transmission state is a first uplink transmission state in which uplink data can be simultaneously transmitted on an uplink carrier corresponding to all network side devices, or is a second uplink transmission state in which uplink data can be simultaneously transmitted on an uplink carrier corresponding to a part of network side devices, and further configured determine, according to the determined uplink transmission state, whether network side devices that can trigger the UE to transmit data are all of the network side devices or are the part of the network side devices.

Further, the network side device further includes a scheduler 702, configured to send scheduling information to the UE, to perform scheduling on the UE. The network side device is a network side device that can communicate with the UE.

In FIG. 8, in a bus architecture (represented by a bus 700), the bus 700 may include any quantity of interconnected buses and bridges, and the bus 700 connects various circuits including one or more processors represented by a processor 701 and memories represented by a memory 706. The bus 700 may further connect various other circuits such as a peripheral device, a voltage stabilizer, and a power management circuit. These are known in the art, and therefore are not further described in this specification. A bus interface 707 provides an interface between the bus 700 and a receiver 704 and/or a sender 704. The receiver 704 and the sender 703 may be a same element, that is, a transceiver, providing a unit configured to communicate with various other apparatuses on a transmission medium. The bus interface 707 further provides an interface to the scheduler 702. Data processed by the processor 701 is transmitted on a wireless medium by using an antenna 705. Further, the antenna 705 further receives data and switches the data to the processor 701.

The processor 701 is responsible for managing the bus 700 and general processing, and the memory 706 may be configured to store data that is to be used when the processor 701 performs an operation.

When the network side device is a base station or a base station controller or a relay, the receiver 704 further receives data by using the antenna 705 and processes the data to recover information modulated to a carrier. The information recovered by the receiver 704 is provided to a receive frame processor, and the receive frame processor parses each frame. The receive frame processor decodes the frame, and provides a successfully decoded control signal to the processor 701. If some frames cannot be successfully decoded by the receive frame processor, the processor 701 may further use the ACK and/or NACK protocol to support a repeat request for those frames.

The processor 701 may provide various functions, including timing, peripheral interfacing, voltage adjustment, power management, and another control function. The memory 706 may be configured to store data and software that are in the base station, the base station controller, or the relay.

In an embodiment, the processor 701 is specifically configured to determine the uplink transmission state of the UE according to power information sent by the UE; or determine the uplink transmission state of the UE according to indication information sent by the UE, where the indication information is used to indicate an uplink transmission state suggested by the UE or indicate that the UE needs to switch an uplink transmission state.

In a further embodiment, the processor 701 is specifically configured to determine, according to the power information, a transmit power of an uplink channel that is to be sent by the UE to each network side device; and determine the uplink transmission state of the UE according to a sum of all determined transmit powers and a maximum transmit power of the UE.

Further, the processor 701 is specifically configured to: if a current uplink transmission state of the UE is the second transmission state, compare, with a preset first threshold, a quantity of times that the sum of the transmit powers exceeds the maximum transmit power within a preset time period, and if the quantity of times within the preset time period is less than the preset first threshold, determine that the uplink transmission state of the UE is the first uplink transmission state; or if a current uplink transmission state of the UE is the first transmission state, compare, with a preset second threshold, a quantity of times that the sum of the transmit powers exceeds the maximum transmit power within a preset time period, and if the quantity of times within the preset time period is greater than the preset second threshold, determine that the uplink transmission state of the UE is the second uplink transmission state.

When the uplink transmission state suggested by the UE is the second uplink transmission state, the auxiliary scheduling information further includes identifier information of the part of the network side devices.

Further, the processor 701 is further configured to determine scheduling manners of all of the network side devices or the part of the network side devices for the UE.

In a further embodiment, the network side device further includes: the sender 703, configured to notify the UE of the uplink transmission state determined by the network side device and the scheduling manner for the UE.

Further, the sender 703 is further configured to forward the determined uplink transmission state and the scheduling manner for the UE to another network side device, and notify the other network side device to trigger, according to the determined uplink transmission state and the scheduling manner for the UE, the UE to transmit data.

Still further, the sender 703 is further configured to forward, to another network side device, the auxiliary scheduling information sent by the UE.

Variations and specific examples of the data transmission method in the embodiments of FIG. 2 and FIG. 3 are also applicable to the network side device in this embodiment. According to the foregoing detailed descriptions of the data transmission method, a person skilled in the art may clearly understand an implementation method of the network side device in this embodiment; therefore, for brevity of the specification, details are not described herein again.

One or more technical solutions provided in the embodiments of this application have at least the following technical effects or advantages:

In the embodiments of this application, UE may work in two uplink transmission states, where a first uplink transmission state is specifically a state in which the UE can simultaneously transmit uplink data on an uplink carrier corresponding to all network side devices, and a second uplink transmission state is specifically a state in which the UE can simultaneously transmit uplink data on an uplink carrier corresponding to a part of the network side devices; a network side device can determine an uplink transmission state of the UE according to auxiliary scheduling information sent by the UE, and further determine, according to the uplink transmission state of the UE, whether network side devices that can trigger the UE to transmit data are all of the network side devices or are a second part of the network side devices; and then the UE transmits data according to scheduling information sent by the second part of or all of the network side devices. As can be seen, in the embodiments, a usage degree of a capability of UE can be determined according to auxiliary scheduling information, and when an actual situation allows, the capability of the UE can be fully used, and uplink data is transmitted on an uplink carrier corresponding to all of the network side devices; or when an actual situation does not allow, the capability of the UE is controlled, and the UE transmits uplink data on an uplink carrier corresponding to a second part of the network side devices. Therefore, compared with a case in the prior art that the UE can work, at each moment, on only an uplink carrier corresponding to one base station, the capability of the UE is fully used, and waste of resources is avoided.

A person skilled in the art should understand that the embodiments of the present application may be provided as a method, a system, or a computer program product. Therefore, the present application may use a form of hardware only embodiments, software only embodiments, or embodiments with a combination of software and hardware. Moreover, the present invention may use a form of a computer program product that is implemented on one or more computer-usable storage media (including but not limited to a disk memory, an optical memory, and the like) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A data transmission method between multiple network side devices and user equipment (UE), comprising:
   sending, by the UE, auxiliary scheduling information to at least one network side device among the multiple network side devices, to instruct the at least one network side device to determine an uplink transmission state of the UE according to the auxiliary scheduling information and determine, according to the uplink transmission state of the UE, whether the UE can be triggered to transmit uplink data by all of the network side devices or by a plurality of the multiple network side devices,
   wherein the plurality of the multiple network side devices is fewer than all of the multiple network side devices,
   wherein the uplink transmission state is a first uplink transmission state in which uplink data can be simultaneously transmitted on uplink carriers corresponding to all of the multiple network side devices, or is a second uplink transmission state in which uplink data can be simultaneously transmitted on uplink carriers corresponding to plurality of the multiple network side devices, and wherein the auxiliary scheduling information comprises a suggested uplink transmission state;

when a current uplink transmission state of the UE is the second transmission state, comparing, with a preset first threshold, a quantity of times that a sum of all transmit powers of uplink channels sent to each network side device exceeds a maximum transmit power within a preset time period, and if the quantity of times within the preset time period is less than the preset first threshold, determining that the suggested uplink transmission state is the first uplink transmission state, or determining that the uplink transmission state of the UE needs to be switched from the second transmission state to the first transmission state, or when the current uplink transmission state of the UE is the first transmission state, comparing, with a preset second threshold, a quantity of times that the sum of the transmit powers exceeds the maximum transmit power within a preset time period, and if the quantity of times within the preset time period is greater than the preset second threshold, determining that the suggested uplink transmission state is the second uplink transmission state, or determining that the uplink transmission state of the UE needs to be switched from the first transmission state to the second transmission state; and transmitting, by the UE, uplink data according to scheduling information sent by the plurality of or all of the multiple network side device.

2. The method according to claim 1, wherein the sending is performed when the at least one network side device can control scheduling by another network side device.

3. A data transmission method, comprising:
receiving, by a network side device, auxiliary scheduling information sent by user equipment (UE);
determining, by the network side device, an uplink transmission state of the UE according to the auxiliary scheduling information, wherein the uplink transmission state is a first uplink transmission state in which uplink data can be simultaneously transmitted on uplink carriers corresponding to all of multiple network side devices, or is a second uplink transmission state in which uplink data can be simultaneously transmitted on uplink carriers corresponding to a plurality of network side devices, wherein the plurality of the multiple network side devices is fewer than all of the multiple network side devices; and
determining, by the network side device according to the determined uplink transmission state, whether network side devices that can trigger the UE to transmit uplink data are all of the network side devices or are the plurality of the network side devices,
wherein determining, by the network side device, an uplink transmission state of the UE according to the auxiliary scheduling information comprises:
determining, by the network side device, the uplink transmission state of the UE according to power information sent by the UE; or
determining, by the network side device, the uplink transmission state of the UE according to indication information sent by the UE, wherein the indication information is used to indicate an uplink transmission state suggested by the UE or indicate that the UE needs to switch an uplink transmission state, wherein determining, by the network side device, the uplink transmission state of the UE according to power information sent by the UE comprises:
determining, by the network side device according to the power information, a transmit power of an uplink channel that is to be sent by the UE to each network side device; and
determining, by the network side device, the uplink transmission state of the UE according to a sum of all determined transmit powers and a maximum transmit power of the UE,
wherein determining, by the network side device, the uplink transmission state of the UE according to a sum of all determined transmit powers and a maximum transmit power of the UE comprises:
when a current uplink transmission state of the UE is the second transmission state, comparing, by the network side device with a preset first threshold, a quantity of times that the sum of the transmit powers exceeds the maximum transmit power within a preset time period, and if the quantity of times within the preset time period is less than the preset first threshold, determining that the uplink transmission state of the UE is the first uplink transmission state; or
when a current uplink transmission state of the UE is the first transmission state, comparing, by the network side device with a preset second threshold, a quantity of times that the sum of the transmit powers exceeds the maximum transmit power within a preset time period, and if the quantity of times within the preset time period is greater than the preset second threshold, determining that the uplink transmission state of the UE is the second uplink transmission state.

4. The method according to claim 3, further comprising:
determining, by the network side device, scheduling manners of all of the network side devices or the plurality of the network side devices for the UE;
notifying, by the network side device, the UE of the uplink transmission state determined by the network side device and the scheduling manner for the UE; and
forwarding, by the network side device, the determined uplink transmission state and the scheduling manner for the UE to another network side device, and notifying the another network side device to trigger, according to the determined uplink transmission state and the scheduling manner for the UE, the UE to transmit data.

5. User equipment, comprising:
a sender, configured to:
send auxiliary scheduling information to at least one network side device among multiple network side devices, to instruct the at least one network side device to determine an uplink transmission state of the user equipment UE according to the auxiliary scheduling information and determine, according to the uplink transmission state of the UE, whether the UE can be triggered to transmit uplink data by all of the network side devices or by a plurality of the multiple network side devices, wherein the plurality of the multiple network side devices is fewer than all of the multiple network side devices, wherein the uplink transmission state is a first uplink transmission state in which uplink data can be simultaneously transmitted on uplink carriers corresponding to all of the multiple network side devices, or is a second uplink transmission state in which uplink data can be simultaneously transmitted on uplink carriers corresponding to the plurality of the multiple network side devices, and transmit uplink data according to scheduling information sent by the plurality of or all of the multiple network side devices; and a processor, configured to process data before the sender transmits the data, wherein the auxiliary scheduling information comprises:
indication information for indicating an uplink transmission state suggested by the UE or indicating that the UE needs to switch an uplink transmission state; or power information, wherein the processor is further configured to:
determine a transmit power of an uplink channel to be sent to each network side device; and
determine, according to a sum of all determined transmit powers and a maximum transmit power of the UE, the suggested uplink transmission state or that the UE needs to switch an uplink transmission state, and wherein the processor is configured to:
when a current uplink transmission state of the UE is the second transmission state, compare, with a preset first threshold, a quantity of times that the sum of the transmit powers exceeds the maximum transmit power within a preset time period, and when the quantity of times within the preset time period is less than the preset first threshold, determine that the suggested uplink transmission state is the first uplink transmission state, or determine that the uplink transmission state of the UE needs to be switched from the first transmission state to the second transmission state; or when a current uplink transmission state of the UE is the first transmission state, compare, with a preset second threshold, a quantity of times that the sum of the transmit powers exceeds the maximum transmit power within a preset time period, and when the quantity of times within the preset time period is greater than the preset second threshold, determine that the suggested uplink transmission state is the second uplink transmission state, or determine that the uplink transmission state of the UE needs to be switched from the first transmission state to the second transmission state.

6. The user equipment according to claim 5, wherein the sender is configured to:
when the at least one network side device can control scheduling by another network side device, send the auxiliary scheduling information to the at least one network side device.

7. A network side device, comprising:
a receiver, configured to receive auxiliary scheduling information sent by user equipment UE; and
a processor, configured to:
determine an uplink transmission state of the UE according to the auxiliary scheduling information, wherein the uplink transmission state is a first uplink transmission state in which uplink data can be simultaneously transmitted on uplink carriers corresponding to all of multiple network side devices, or is a second uplink transmission state in which uplink data can be simultaneously transmitted on uplink carriers corresponding to a plurality of network side devices, wherein the plurality of the multiple network side devices is fewer than all of the multiple network side devices, determine, according to the determined uplink transmission state, whether network side devices that can trigger the UE to transmit uplink data are all of the network side devices or are the plurality of the network side devices, wherein the processor is configured to:
determine the uplink transmission state of the UE according to power information sent by the UE; or
determine the uplink transmission state of the UE according to indication information sent by the UE, wherein the indication information is used to indicate an uplink transmission state suggested by the UE or indicate that the UE needs to switch an uplink transmission state, wherein the processor is configured to:
determine, according to the power information, a transmit power of an uplink channel that is to be sent by the UE to each network side device; and
determine the uplink transmission state of the UE according to a sum of all determined transmit powers and a maximum transmit power of the UE, and wherein the processor is configured to:
when a current uplink transmission state of the UE is the second transmission state, compare, with a preset first threshold, a quantity of times that the sum of the transmit powers exceeds the maximum transmit power within a preset time period, and when the quantity of times within the preset time period is less than the preset first threshold, determine that the uplink transmission state of the UE is the first uplink transmission state; or when a current uplink transmission state of the UE is the first transmission state, compare, with a preset second threshold, a quantity of times that the sum of the transmit powers exceeds the maximum transmit power within a preset time period, and when the quantity of times within the preset time period is greater than the preset second threshold, determine that the uplink transmission state of the UE is the second uplink transmission state.

8. The network side device according to claim 7, wherein:
the processor is further configured to determine scheduling manners of all of the network side devices or the plurality of the network side devices for the UE; and
the network side device further comprises:
a sender, configured to notify the UE of the uplink transmission state determined by the network side device and the scheduling manner for the UE.

9. The network side device according to claim 8, wherein the sender is further configured to:
forward the determined uplink transmission state and the scheduling manner for the UE to another network side device; and
notify the other network side device to trigger, according to the determined uplink transmission state and the scheduling manner for the UE, the UE to transmit data.

* * * * *